United States Patent
Gabel

(10) Patent No.: US 9,877,176 B2
(45) Date of Patent: Jan. 23, 2018

(54) METHODS AND SYSTEMS OF MANAGING ACCIDENT COMMUNICATIONS OVER A NETWORK

(71) Applicant: Medlegal Network, Inc., Santa Monica, CA (US)

(72) Inventor: Gershon Gabel, Santa Monica, CA (US)

(73) Assignee: Medlegal Network, Inc., Santa Monica, CA (US)

( * ) Notice: Subject to any disclaimer, the term of this patent is extended or adjusted under 35 U.S.C. 154(b) by 0 days.

(21) Appl. No.: 14/133,330

(22) Filed: Dec. 18, 2013

(65) Prior Publication Data

US 2015/0172894 A1   Jun. 18, 2015

(51) Int. Cl.

| | | |
|---|---|---|
| *H04M 11/04* | (2006.01) | |
| *H04W 4/22* | (2009.01) | |
| *H04W 4/02* | (2009.01) | |
| *H04W 4/16* | (2009.01) | |
| *G06Q 10/10* | (2012.01) | |
| *G06Q 50/30* | (2012.01) | |

(52) U.S. Cl.
CPC .............. *H04W 4/22* (2013.01); *G06Q 10/10* (2013.01); *H04W 4/02* (2013.01); *H04W 4/16* (2013.01); *G06Q 50/30* (2013.01)

(58) Field of Classification Search
CPC ......... H04W 4/22; H04W 4/02; H04W 64/00; H04W 76/007; G08B 21/10; G08B 25/10; G08B 25/00; G08B 25/14; G08B 21/00; G08B 25/08; G08B 25/016; G08B 25/12; H04M 11/04; H04M 3/42; G06F 17/30; G08G 1/09; G06Q 10/10; G06Q 50/30

USPC ........... 455/404.1, 404.2; 707/803, E17.028, 707/E17.058, E17.101; 340/436, 539.11; 705/4; 701/301

See application file for complete search history.

(56) References Cited

U.S. PATENT DOCUMENTS 6,098,070 A * 8/2000 Maxwell ................ G06Q 10/10
6,405,033 B1 * 6/2002 Kennedy ................ H04M 3/51
                                                        455/404.1

(Continued)

FOREIGN PATENT DOCUMENTS

JP          06-119578 A      4/1994
JP          5151799 B2        2/2013

(Continued)

OTHER PUBLICATIONS

International Search Report for International Application No. PCT/US2014/070670, dated Apr. 13, 2015, 3 pages.

(Continued)

*Primary Examiner* — Keith Fang
*Assistant Examiner* — B.M. M Hannan
(74) *Attorney, Agent, or Firm* — Knobbe, Martens, Olson & Bear LLP

(57) ABSTRACT

Systems and methods are configured to detect the occurrence of accidents, and to collect, process, and distribute accident related data. The accident related information may include location information, accident image information, and/or other information. Optionally, upon detection of an accident, emergency contacts of a user involved in the accident may be automatically notified of the accident. Service providers may be contacted over a network to provide accident-related services.

20 Claims, 42 Drawing Sheets

(56) References Cited

U.S. PATENT DOCUMENTS

| | | |
|---|---|---|
| 6,658,389 B1 | 12/2003 | Alpdemir |
| 7,016,897 B2 | 3/2006 | Hill et al. |
| 7,398,461 B1 | 7/2008 | Broder et al. |
| 7,702,524 B1 | 4/2010 | Whibbs et al. |
| 7,752,054 B1 | 7/2010 | Hoppe et al. |
| 7,769,826 B2 | 8/2010 | Gustafsson |
| 9,330,275 B1 | 5/2016 | Endresen |
| 9,412,103 B1 | 8/2016 | d'Escragnolle |
| 2001/0044735 A1 | 11/2001 | Colburn et al. |
| 2002/0038233 A1* | 3/2002 | Shubov et al. ............... 705/8 |
| 2002/0059084 A1* | 5/2002 | Wahlbin ............ G06Q 10/10 705/4 |
| 2002/0091879 A1 | 7/2002 | Beriker |
| 2002/0115423 A1* | 8/2002 | Hatae et al. ............. 455/404 |
| 2003/0028406 A1 | 2/2003 | Herz et al. |
| 2003/0069744 A1 | 4/2003 | Craig et al. |
| 2003/0149577 A1 | 8/2003 | Young et al. |
| 2004/0083395 A1 | 4/2004 | Blechman |
| 2004/0087301 A1 | 5/2004 | Tobin |
| 2004/0093280 A1* | 5/2004 | Yamaguchi ....... G06Q 30/0601 705/26.1 |
| 2005/0010563 A1 | 1/2005 | Gross et al. |
| 2005/0033641 A1 | 2/2005 | Jha et al. |
| 2005/0035208 A1 | 2/2005 | Elliot |
| 2005/0099272 A1* | 5/2005 | Kuo .................. B60R 25/305 340/426.1 |
| 2005/0102159 A1 | 5/2005 | Mondshine |
| 2006/0085216 A1 | 4/2006 | Guerrero |
| 2006/0108063 A1 | 5/2006 | Umemoto et al. |
| 2007/0011128 A1 | 1/2007 | Meyers |
| 2007/0179818 A1 | 8/2007 | Magnus |
| 2007/0179845 A1 | 8/2007 | Jain |
| 2007/0179846 A1 | 8/2007 | Jain et al. |
| 2007/0179847 A1 | 8/2007 | Jain |
| 2007/0179848 A1 | 8/2007 | Jain et al. |
| 2007/0179849 A1 | 8/2007 | Jain |
| 2007/0179853 A1 | 8/2007 | Feige et al. |
| 2007/0260520 A1 | 11/2007 | Jha et al. |
| 2007/0294258 A1 | 12/2007 | Caldwell |
| 2008/0065726 A1 | 3/2008 | Schoenberg |
| 2008/0103823 A1 | 5/2008 | Papa |
| 2008/0192129 A1 | 8/2008 | Walker |
| 2008/0306996 A1* | 12/2008 | McClellan et al. ........ 707/104.1 |
| 2009/0198521 A1* | 8/2009 | Barker ............................. 705/3 |
| 2009/0276708 A1 | 11/2009 | Smith |
| 2010/0004989 A1 | 1/2010 | Bonalle et al. |
| 2011/0099116 A1 | 4/2011 | Gabel |
| 2011/0246244 A1* | 10/2011 | O'Rourke ............ G06Q 10/10 705/4 |
| 2011/0290871 A1 | 12/2011 | Jon et al. |
| 2012/0109690 A1* | 5/2012 | Weinrauch ............ G06Q 10/10 705/4 |
| 2012/0322401 A1* | 12/2012 | Collins .................. H04W 4/22 455/404.1 |
| 2013/0182002 A1* | 7/2013 | Macciola .............. H04N 1/387 345/589 |
| 2013/0290036 A1* | 10/2013 | Strange ................. G06Q 40/08 705/4 |
| 2013/0297353 A1* | 11/2013 | Strange ................. G06Q 40/08 705/4 |
| 2014/0040287 A1 | 2/2014 | Frome |
| 2014/0114691 A1 | 4/2014 | Pearce |
| 2014/0203071 A1 | 7/2014 | Eggert |
| 2014/0365281 A1 | 12/2014 | Onischuk |
| 2014/0368601 A1* | 12/2014 | deCharms ................. 348/14.02 |
| 2015/0009327 A1 | 1/2015 | Love |
| 2015/0026174 A1 | 1/2015 | Nuggehalli |
| 2015/0081362 A1* | 3/2015 | Chadwick ............. G06Q 50/30 705/7.14 |
| 2015/0127570 A1 | 5/2015 | Doughty et al. |
| 2015/0341225 A1 | 11/2015 | Baarman |

FOREIGN PATENT DOCUMENTS

| | | |
|---|---|---|
| KR | 10-2003-0008655 A | 1/2003 |
| KR | 10-1095156 B1 | 12/2011 |
| KR | 10-2013-0119680 | 11/2013 |

OTHER PUBLICATIONS

Written Opinion of the International Searching Authority for International Application No. PCT/US2014/070670, dated Apr. 13, 2015, 6 pages.

HispanicMarketWeekly, Referral Services: Legal and Medical, Published: Apr. 3, 2008 (http://www.hispanicmarketweekly.com/featureArticle.cms?id=972&mode=print), 2 pages.

LegalMatch, Find the Right Lawyer Now!, Copyright 1999-2010 (http://web.archive.org/web/20091027232223/http://www.legalmatch.com/ , 1 page.

Office Action from Mexican Patent Application No. MX/a/2010/010404, dated Sep. 1, 2012, 3 pages.

International Search Report and Written Opinion (12 pages) for PCT/US2017/016724, dated Jun. 9, 2017.

* cited by examiner

Personal Data Area

Take photos to report accidents

Flashlight

Report Message Area from other friends or relatives

Close Session

MedLegal Group

Mobile Application Manager

Initiation | All applications | SOS | Taxi | Cranes | Car | Lawyers | GML | My Account | Exit

| Image | Customer Name | Other Party's Phone Number | Other Party's License Number | Other Party's Insurance Carrier Name | Other Party's Insurance Policy Number | Other Party's Insurance Provider Phone Number | Is There A Police Report | First Name On The Police Report | | | Time | Status | View Map |
|---|---|---|---|---|---|---|---|---|---|---|---|---|---|
| | Gershon | | | | | | | | | | 14/10/2013 11:11:45 | Awaiting Response | Gmaps |
| | Felix A Cervantes Lopez | | | | | | No | No | View Witnesses | View Passengers | 03/10/2013 16:31:34 | Awaiting Response | Gmaps |
| | Enrique | | | | | | | | View Witnesses | View Passengers | 03/10/2013 16:31:04 | No Data | Gmaps |
| | Felix A Cervantes Lopez | | | | | | No | No | View Witnesses | View Passengers | 03/10/2013 16:29:16 | Awaiting Response | Gmaps |
| Graphic Image Here | Felix A Cervantes Lopez | | | | | | No | No | View Witnesses | View Passengers | 03/10/2013 16:26:04 | Awaiting Response | Gmaps |
| | Felix A Cervantes Lopez | | | | | | No | No | View Witnesses | View Passengers | 03/10/2013 16:23:25 | Awaiting Response | Gmaps |
| | Felix A Cervantes Lopez | | | | | | | | View Witnesses | View Passengers | 03/10/2013 09:36:34 | Awaiting Response | Gmaps |
| | Enrique | | 235644 | hgfghf | tyyyt | 56665 | | | View Witnesses | View Passengers | 11/09/2013 19:37:57 | Awaiting Response | Gmaps |
| | Felix A Cervantes Lopez | | | | | | No | No | View Witnesses | View Passengers | 11/09/2013 16:27:43 | Awaiting Response | Gmaps |
| | Felix A Cervantes Lopez | | | | | | | | View Witnesses | View Passengers | 11/09/2013 16:27:01 | No Data | Gmaps |

*FIG. 10J*

MedLegal Group

Initiation | All applications | SOS | Taxi | Cranes | Car | Lawyers | GML | My Account | Exit

Mobile Application Manager

| Image | Customer | Employer | Insurance Company | Insurance Company Telephone Number | Reported To Supervisor? | Supervisor Name | Date Of Report | Date Last Sought Medical Attention | Still Working? | Last Date The User Worked | View Witnesses | Status | Time | View Map |
|---|---|---|---|---|---|---|---|---|---|---|---|---|---|---|
| | Felix A Cervantes Lopez | | | | 0 | | | | No | | View Witnesses | Awaiting Response | 14/10/2013 11:11:45 | Gmaps |
| | Gershon | hf (; jn | h gg hjh | 64 | Yes | ghffga | 02/09/2013 | | Yes | | View Witnesses | Awaiting Response | 03/10/2013 16:31:34 | Gmaps |
| | Felix A Cervantes Lopez | | | | | | | | | | View Witnesses | No Data | 03/10/2013 16:31:04 | Gmaps |
| Graphic Image Here | Enrigques | hshsjsjs | jsjsjs | 373838383 | Yes | | 06/08/2013 | 21/08/2013 | Yes | | View Witnesses | Awaiting Response | 03/10/2013 16:29:16 | Gmaps |
| | Rodrigo Laisequilla Ramos | | | | | | | | | | | No Data | 03/10/2013 16:23:25 | Gmaps |
| | Felix A Cervantes Lopez | | | | 0 | | | | No | | View Witnesses | Awaiting Response | 03/10/2013 16:23:25 | Gmaps |
| | Felix A Cervantes Lopez | | | | 0 | | | | No | | View Witnesses | Awaiting Response | 03/10/2013 09:36:34 | Gmaps |
| | Felix A Cervantes Lopez | | | | 0 | | | | No | | View Witnesses | Awaiting Response | 11/09/2013 19:37:57 | Gmaps |
| | Felix A Cervantes Lopez | | | | | | | | | | View Witnesses | Awaiting Response | 11/09/2013 16:27:43 | Gmaps |
| | Felix A Cervantes Lopez | | | | | | | | No | | View Witnesses | No Data | 11/09/2013 16:27:01 | Gmaps |

FIG. 10K

MedLegal Group

Mobile Application Manager

| Image | Customer | SOS | Location | Taxi | Receipt Number | Cranes | Insurance Company | Car | Policy Number | Lawyers | Telephone Number of Insurance Co. | GML | View Witnesses | My Account | Time | Exit | Status | View Map |
|---|---|---|---|---|---|---|---|---|---|---|---|---|---|---|---|---|---|---|
| | Enrique Felix A Cervantes Lopez | | sjsjsj | | hdhshs | | dhdhd | | dhdhhd | | 37383829 | | View Witnesses | | 24/09/2013 13:27:08 | | Awaiting Response | Gmaps |
| | Gershon | | | | | | | | | | | | View Witnesses | | 11/09/2013 16:28:55 | | Awaiting Response | Gmaps |
| | Felix A Cervantes | | | | | | | | | | | | View Witnesses | | 04/09/2013 14:04:25 | | Awaiting Response | Gmaps |
| | Enrique | | Kaksksksk | | $#&#&# | | #&#&#*# | | jsksksks | | 272728282 | | View Witnesses | | 27/08/2013 11:27:31 | | Awaiting Response | Gmaps |
| | | | | | | | | | | | | | View Witnesses | | 26/08/2013 19:19:47 | | No Data | Gmaps |
| | Rodrigo Laisequilla Ramos | | | | | | | | | | | | View Witnesses | | 23/08/2013 08:34:10 | | No Data | Gmaps |
| | Rodrigo Laisequilla Ramos | | | | | | | | | | | | View Witnesses | | 22/08/2013 22:15:42 | | Awaiting Response | Gmaps |
| | Rodrigo Laisequilla Ramos | | | | | | | | | | | | View Witnesses | | 22/08/2013 16:23:51 | | No Data | Gmaps |
| | Rodrigo Laisequilla Ramos | | | | | | | | | | | | View Witnesses | | 22/08/2013 16:16:07 | | Awaiting Response | Gmaps |
| | Rodrigo Laisequilla Ramos | | | | | | | | | | | | View Witnesses | | 22/08/2013 16:14:03 | | Awaiting Response | Gmaps |
| | Felix A Cervantes Lopez | | | | | | | | | | | | View Witnesses | | 22/08/2013 08:24:56 | | Awaiting Response | Gmaps |
| | Felix A Cervantes Lopez | | | | | | | | | | | | View Witnesses | | 21/08/2013 22:47:56 | | Awaiting Response | Gmaps |
| | Felix A Cervantes Lopez | | | | | | | | | | | | View Witnesses | | 21/08/2013 13:08:09 | | No Data | Gmaps |
| | Felix A Cervantes Lopez | | | | | | | | | | | | View Witnesses | | 20/08/2013 22:43:17 | | Awaiting Response | Gmaps |
| | Felix A Cervantes Lopez | | | | | | | | | | | | View Witnesses | | 20/08/2013 22:34:05 | | Awaiting Response | Gmaps |
| | Felix A Cervantes Lopez | | | | | | | | | | | | View Witnesses | | 20/08/2013 22:33:16 | | Awaiting Response | Gmaps |
| | Rodrigo Laisequilla Ramos | | | | | | | | | | | | View Witnesses | | 20/08/2013 22:32:28 | | Awaiting Response | Gmaps |

*FIG. 10L*

METHODS AND SYSTEMS OF MANAGING ACCIDENT COMMUNICATIONS OVER A NETWORK

BACKGROUND OF THE INVENTION

Field of the Invention

The present invention is related to managing communications, and in particular to methods and systems for managing communications related to an accident or injury.

Description of the Related Art

Conventionally, when an accident occurs, such as in a vehicular accident, the victim may be too distraught or overwhelmed to collect the needed information, such as insurance information and photographs of the accident, and may be uncertain as to who to contact regarding the accident. Thus, often victims may lose the ability to obtain adequate compensation for the harm to their persons and property caused by the accident.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Systems and methods are disclosed for collecting and distributing information over a network, such as a data network and/or a telephony network. For example, the information may be related to an accident, such as a user vehicular accident, personal injury, or a workplace accident and/or injury. Certain embodiments facilitate the collection and reporting of accident and/or injury information by a user. Certain embodiments facilitate the provision of accident related services to a user (e.g., taxi services, towing service, auto repair services, etc.). Certain embodiments provide an application which may be installed on a user device, such as a mobile phone, which facilitates accident data collection and user communication with a remote system (e.g., an accident communication processing system) and accident-related service providers.

An example aspect may include a method of managing accident-related communications, comprising some or all of the following acts: providing an application, comprising software, configured to be downloaded to a mobile device of a user, wherein the application is configured to perform one or more of: enable the user to report, to an accident information processing system, vehicular accidents, via a first set of user interfaces, the first set of user interfaces configured to receive vehicular accident related information comprising: a name of a driver of a vehicle involved in the vehicular accident; a driver's license number of the driver; contact information of the driver; insurance information of the driver; an indication as to whether there were passengers, pedestrian in at least one vehicle involved in the vehicular accident; optionally, an indication as to whether there were one or more pedestrians involved in the accident; an indication as to whether the vehicular accident was reported to the police; an indication as to whether there was at least one witness to the vehicular accident or injury; image information related to the vehicular accident; enable the user to report workplace accidents or injury, to the accident information processing system, via a second set of user interfaces different than the first set of user interface, the second set of user interfaces configured to receive workplace accident related information comprising: an employer name; employer contact information; an indication as to whether the user is currently working for the employer; an indication as to whether the user reported the workplace accident or injury to the employer; an indication as to when the user last obtained medical services; workplace-related insurance information; enable the user to request referrals to least a taxi service, a tow service, and an attorney; enable the user to specify one or more contacts to whom an accident notification is to be provided if an accident occurs; enable the user to activate a camera flash on the user mobile device independently of capturing an image using a camera of the mobile device; enable the user to capture an image using the mobile device camera; receiving at the accident information processing system a first accident report regarding a first accident via the downloaded application installed on the user mobile device; at least partly in response to receiving the first accident report, automatically transmitting an accident notification to the user-specified one or more contacts to whom an accident notification is to be provided; determining, by the accident information processing system, what type of accident the user is reporting based at least in part on information associated with the first accident report; determining, by the accident information processing system, a location of the first accident based at least in part on the first accident report and/or determining a physical address associated with the user; determining, by the accident information processing system, which attorney has a first set of rights with respect to the location of the first accident and/or the physical address associated with the user, and attorney information accessed from a data store; selecting, by the accident information processing system, at least a first attorney based at least in part on the determination as to which attorney has the first set of rights; transmitting, by the accident information processing system, information regarding the first attorney to the application installed on the user mobile device for presentation to the user, the information regarding the selected first attorney including a rating provided by at least one other user; enabling the user to select the first attorney via the application; at least partly in response to detecting that the user has selected the first attorney, transmitting, by the accident information processing system, at least a portion of the first accident report to the selected attorney; receiving, by the accident information processing system, a request from the user for a taxi service; determining a current location of the user; based at least in part on the user's current location, identifying, by the accident information processing system, one or more taxi services; transmitting, by the accident information processing system, to the application installed on the user mobile device, a listing of one or more identified taxi services; enabling the user to select a listed taxi service; enabling the user to initiate a taxi request to a user selected taxi service; wherein the accident information processing system comprises computing hardware, a network interface, and a data store, the data store comprising non-transitory memory and an accident database.

Optionally, the foregoing method may include one or more of: wherein the application is configured to provide a user interface configured to receive information for a personal injury report, the user interface configured to receive information comprising an accident facility identifier corresponding to a facility is where the accident occurred, a phone number associated with the facility, an accident report number associated with a report made to a representative associated with the facility, and an indication as to whether an ambulance responded to the accident at the facility; wherein the first set of rights comprises at least an advertising right for a first location; wherein the listing of one or more identified taxi services comprises a listing of one or more identified taxi services and respective rates charged by the one or more identified taxi services; wherein the application further comprises an emergency call control, the method further comprising detecting a user activation of the emergency call control and at least partly in response automatically transmitting a notification to the user-specified one or more contacts to whom an accident notification is to be provided.

An example aspect may include a method of managing accident-related communications, comprising one or more of: providing an application, comprising software, configured to be downloaded to a mobile device of a user, wherein the application is configured to perform one or more of: enable the user to report, to an accident information processing system, vehicular accidents via a first set of user interfaces, the first set of user interfaces configured to receive vehicular accident related information comprising: a name of a driver of a vehicle involved in the vehicular accident; a driver's license number of the driver; contact information of the driver; insurance information of the driver; an indication as to whether there were passengers in at least one vehicle involved in the vehicular accident; an indication as to whether the vehicular accident was reported to the police; an indication as to whether there was at least one witness to the vehicular accident; image information related to the vehicular accident; enable the user to report workplace accidents, to the accident information processing system, via a second set of user interfaces different than the first set of user interface, the second set of user interfaces configured to receive workplace accident related information comprising: an employer name; employer contact information; enable the user to request referrals to least a taxi service and an attorney; enable the user to specify one or more contacts to whom an accident notification is to be provided if an accident occurs; enable the user to capture an image using the mobile device camera; receiving at the accident information processing system a first accident report regarding a first accident via the downloaded application on the user mobile device; in response to receiving the first accident report and based at least in part on contacts specified by the user to whom an accident notification is to be provided, automatically transmitting an accident notification to the user specified one or more contacts to whom an accident notification is to be provided; determining, by the accident information processing system, what type of accident the user is reporting based at least in part on the first accident report; determining, by the accident information processing system, a location of the first accident based at least in part on the first accident report and/or determining a physical address associated with the user; determining, by the accident information processing system, which attorney has a first set of rights with respect to the location of the first accident and/or the physical home address associated with the user, and attorney information accessed from a data store; selecting, by the accident information processing system, at least a first attorney based at least in part on the determination as to which attorney has the first set of rights; transmitting, by the accident information processing system, information regarding the first attorney to the application installed on the user mobile device for presentation to the user, the information regarding the selected first attorney including a rating provided by at least one other user; enabling the user to select the first attorney via the application; at least partly in response to detecting that the user has selected the first attorney, transmitting, by the accident information processing system, at least a portion of the first accident report to the selected attorney; receiving, by the accident information processing system, a request from the user for a taxi service and/or a tow service and/or repair shop; determining a current location of the user; based at least in part on the user's current location, identifying, by the accident information processing system, one or more taxi services and/or a tow services having, respectively, a taxi or a tow truck within a first range of the user's current location; transmitting, by the accident information processing system, to the application installed on the user mobile device a listing of one or more identified taxi services and/or tow services; enabling the user to select a listed taxi service and/or tow service; enabling the user to initiate a communication to a user selected taxi service and/or tow service; wherein the accident information processing system comprises computing hardware, a network interface, and a data store, the data store comprising non-transitory memory and an accident database.

Optionally, the foregoing method may include one or more of: wherein the application is configured to provide a user interface configured to receive information for a personal injury report, the user interface configured to receive information comprising: an accident facility identifier corresponding to a facility is where the accident occurred, contact information associated with the facility, an accident report number associated with a report made to a representative associated with the facility, and an indication as to whether an ambulance responded to the accident at the facility; wherein the first set of rights comprises at least an advertising right for a first location; wherein the listing of one or more identified taxi services and/or tow services comprises a listing of one or more identified taxi services and respective rates charged by the one or more identified taxi services; wherein the application further comprises an emergency call control, the method further comprising detecting a user activation of the emergency call control and at least partly in response automatically transmitting a notification to the user specified one or more contacts to whom an accident notification is to be provided.

An example aspect may include an accident management system, comprising: a computing system comprising hardware; a non-transitory computer storage medium having stored thereon executable instructions that direct the computing system to perform operations comprising one or more of: providing an application, comprising software, configured to be downloaded to a mobile device of a user, wherein the application is configured to: enable the user to report accidents via a first set of user interfaces, the first set of user interfaces configured to receive vehicular accident related information comprising: a name of a driver of a vehicle involved in the vehicular accident; a driver's license number of the driver; insurance information of the driver; an indication as to whether there were passengers in at least one vehicle involved in the vehicular accident; an indication as to whether the vehicular accident was reported to the police; an indication as to whether there was at least one witness to the vehicular accident; image information related to the vehicular accident; enable the user to report workplace accidents, to the accident information processing system, via a second set of user interfaces different than the first set of user interface, the second set of user interfaces configured to receive workplace accident or injury related information comprising: an employer name; employer contact information; enable the user to request referrals to least a taxi service and an attorney; enable the user to specify one or more contacts to whom an accident notification is to be provided if an accident occurs; enable the user to capture an image using the mobile device camera; receiving a first accident report regarding a first accident via the downloaded application on the user mobile device; in response to receiving the first accident report and based at least in part on contacts specified by the user to whom an accident notification is to be provided, automatically transmitting an accident notification to the user specified one or more contacts to whom an accident notification is to be provided; determining what type of accident the user is reporting based at least in part on the first accident report; determining a location of the first accident based at least in part on the first accident report and/or determining a physical address associated with the user; determining which attorney has a first set of rights with respect to the location of the first accident and/or the physical address associated with the user, and attorney information accessed from a data store; selecting at least a first attorney based at least in part on the determination as to which attorney has the first set of rights; transmitting information regarding the first attorney to the application installed on the user mobile device for presentation to the user, the information regarding the selected first attorney including a rating provided by at least one other user; enabling the user to select the first attorney via the application; at least partly in response to detecting that the user has selected the first attorney, transmitting at least a portion of the first accident report to the selected attorney; receiving a request from the user for a taxi service and/or a tow service; determining a current location of the user; based at least in part on the user's current location, identifying one or more taxi services and/or a tow services having, respectively, a taxi or a tow truck or repair shop within a first range of the user's current location; transmitting to the application installed on the user mobile device a listing of one or more identified taxi services, repair shop and/or tow services; enabling the user to select a listed taxi service and/or tow service; enabling the user to initiate a communication to a user selected taxi service, repair shop and/or tow service.

Optionally, the foregoing system may include one or more of: wherein the application is configured to provide a user interface configured to receive information for a personal injury report, the user interface configured to receive information comprising an accident facility identifier corresponding to a facility is where the accident occurred, contact information associated with the facility, an accident report number associated with a report made to a representative associated with the facility, and an indication as to whether an ambulance responded to the accident at the facility; wherein the first set of rights comprises at least an advertising right for a first location; wherein the listing of one or more identified taxi services and/or tow services comprises a listing of one or more identified taxi services and respective rates charged by the one or more identified taxi services; wherein the application further comprises an emergency call control, the operations further comprising detecting a user activation of the emergency call control and at least partly in response automatically transmitting a notification to the user specified one or more contacts to whom an accident notification is to be provided.

An example aspect may include an accident management system, comprising: a computing system comprising hardware; a non-transitory computer storage medium having stored thereon executable instructions that direct the computing system to perform operations comprising: receiving a first accident report regarding a first accident via an application installed on mobile device of a user; in response to receiving the first accident report and based at least in part on contacts specified by the user to whom an accident notification is to be provided, automatically transmitting an accident notification to the user specified one or more contacts to whom an accident notification is to be provided; determining what type of accident the user is reporting based at least in part on the first accident report; determining a location of the first accident based at least in part on the first accident report, or determining a physical address associated with the user, or determining both the location of the first accident based at least in part on the first accident report and the physical address associated with the user; determining which attorney has a first set of rights with respect to the location of the first accident and/or the physical address associated with the user, and attorney information accessed from a data store; selecting at least a first attorney based at least in part on the determination as to which attorney has the first set of rights; transmitting information regarding the first attorney to the application installed on the user mobile device for presentation to the user, the information regarding the selected first attorney including a rating provided by at least one other user; enabling the user to select the first attorney via the application installed on the user mobile device; at least partly in response to detecting that the user has selected the first attorney, transmitting at least a portion of the first accident report to the selected attorney; receiving a request from the user for a taxi service or a tow service, or both a taxi service and a tow service from the user via the application installed on the user mobile device; determining a current location of the user based at least in part on information provided via the mobile device of the user; based at least in part on the user's current location, identifying one or more taxi services or tow services, or both one or more taxi services and tow services, having, respectively, servicing the user's current location; transmitting to the application installed on the user mobile device a listing of one or more identified taxi services or tow services, or both taxi services and tow services; enabling the user to select a listed taxi service or a listed tow service, or both a listed taxi service and tow service; enabling the user to initiate a communication to a user selected taxi service, repair shop or tow service, or both a user selected taxi service and tow service.

Optionally, the foregoing system may include one or more of: wherein the application is configured to provide a user interface configured to receive information for a personal injury report, the user interface configured to receive information comprising an accident facility identifier corresponding to a facility is where the accident or injury occurred, contact information associated with the facility, an accident report number associated with a report made to a representative associated with the facility, and an indication as to whether an ambulance responded to the accident at the facility; wherein the first set of rights comprises at least an advertising right for a first location; wherein the listing of one or more identified taxi services and/or tow services comprises a listing of one or more identified taxi services and respective rates charged by the one or more identified taxi services; wherein the application further comprises an emergency call control, the operations further comprising detecting a user activation of the emergency call control and at least partly in response automatically transmitting a notification to the user specified one or more contacts to whom an accident notification is to be provided.

BRIEF DESCRIPTION OF THE DRAWINGS

Embodiments will now be described with reference to the drawings summarized below. These drawings and the associated description are provided to illustrate example embodiments, and not to limit the scope of the invention.

FIGS. 10A-10L illustrate administrative user interfaces.

DETAILED DESCRIPTION

Systems and methods are disclosed for collecting, processing, and distributing information over a network, such as a data network. For example, the information may be related to an accident, such as a vehicular accident, personal injury, or a workplace accident or injury.

As noted above, conventionally, when an accident or injury occurs, such as in a vehicular accident, the victim may be too distraught or overwhelmed to collect the needed information, such as insurance information and photographs of the accident, and may be uncertain as to who to contact regarding the accident. Thus, often victims may lose the ability to obtain adequate compensation for the harm to their persons and property caused by the accident. Certain embodiments described herein address such challenged by facilitating the collection of accident information by a user. In addition, certain embodiments facilitate the provision of accident-related services to a user (e.g., taxi services, towing service, auto repair services, etc.).

A system, such as an accident communication processing system, may be provided that interacts with a user that wishes to report an accident and/or related information. An interface may be provided to the user, via a user device remote from the system, for reporting an accident and related information (e.g., information regarding those involved in the accident, witnesses, photographs of the accident scene, insurance information, etc.). The interface may be provided via an application (e.g., a dedicated application, sometimes referred to as an "app") and/or via a webpage which may be rendered by a browser or the like on the user device. Optionally, the application may be configured to request various services (e.g., taxi, towing, repair, and/or legal services), receive service referrals from a remote system, and to detect (or enable the remote accident communication processing system to detect) whether certain contacts of the user should be notified regarding the occurrence of an accident.

The application may be provided by the accident communication processing system (or system operator) and downloaded to the user device, such as a user terminal (e.g., via an application store of a third party or via a site hosted by the accident communication processing system). By way of example, the user terminal may optionally be a mobile device, such as a smartphone or tablet computer, that the user often has in their physical possession, and so is likely to have while conducting activities, such as driving, which may result in an accident. The system operator may promote and advertise the app and related services to encourage people to have the app installed on their terminals so that it is readily available to users in the event of an accident.

Figure 1:
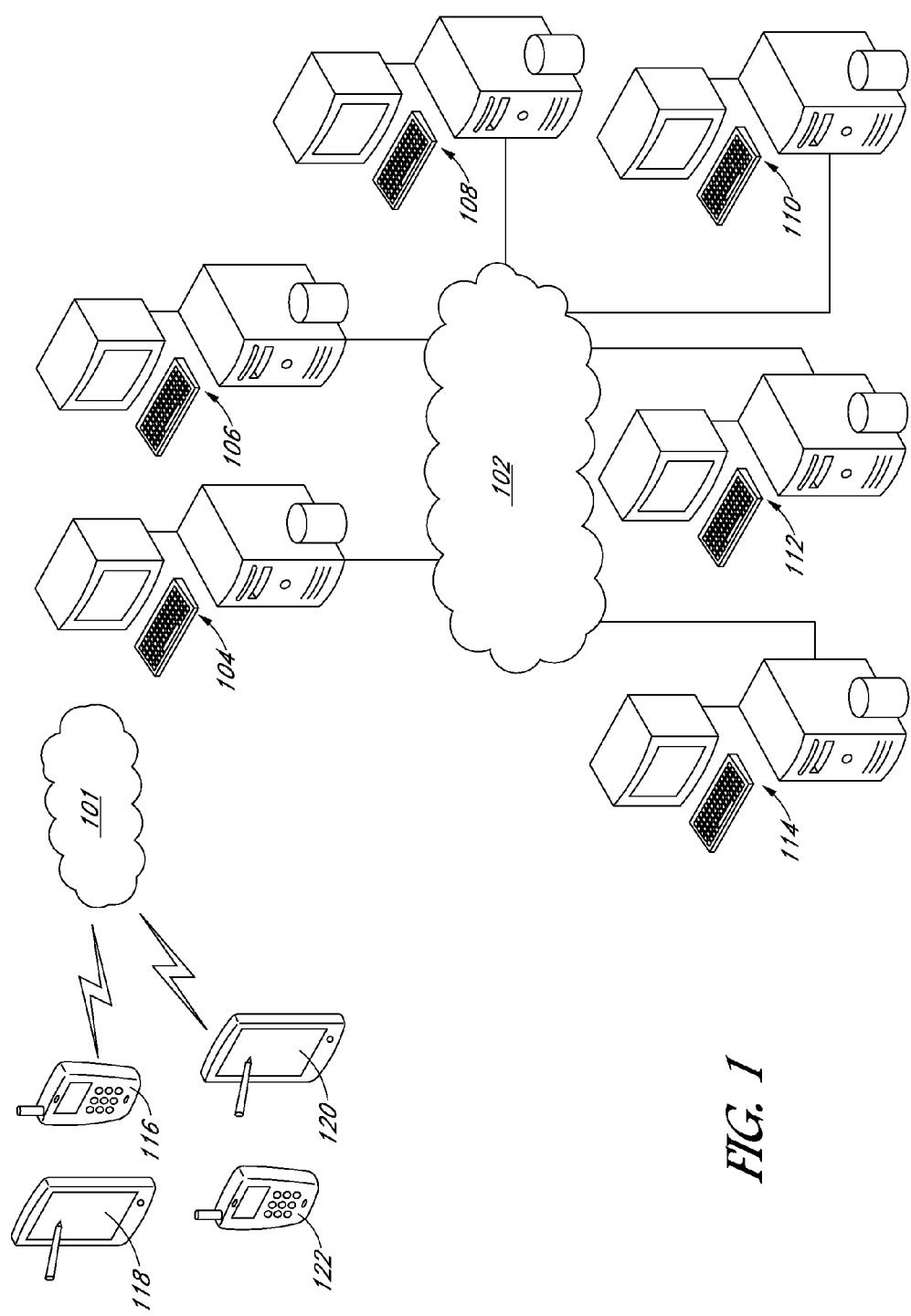
FIG. 1 illustrates an example system and operating environment.

An example embodiment of the system and an example operating environment are illustrated in FIG. 1. The system 104 may include one or more servers or other computer systems. The system 104 may be coupled via one or more network interfaces to a data network 102 (e.g., the Internet) and/or a telephone network 101 (e.g., a wired and/or wireless telephony network). The system 104 may be configured to communicate with user mobile terminals 116, 118 (and/or non-mobile terminals) via respective network interfaces over the telephone network 101 and/or the data network 102, as discussed in greater detail elsewhere herein. The system 104 may also be configured to communicate with one or more transportation service provider systems 106 (and optionally telephones), towing service systems 108 (and optionally telephones), repair service systems 110 (and optionally telephones), one or more emergency response systems 112 and optionally telephones (e.g., associated with police, fire departments, ambulance service providers, hospitals, etc.), one or more legal service provider systems 114 (and optionally telephones), as similarly described elsewhere herein in greater detail. The system 104 may also be configured to communicate with one or more devices 120, 122 (e.g., mobile phones or tablet computers) associated with contacts that a given user has indicated should be notified when certain conditions are detected (e.g., the occurrence of an accident or a call to an emergency service provider), as discussed elsewhere herein in great detail. The system 104 may store (e.g., via a database maintained in non-transitory memory) or have access to user profile/registration for users, as well as information (e.g., contact information, ratings, other information discussed herein, etc.) for various service providers that may provide service to users (e.g., transportation service providers, towing service providers, repair service providers, legal service providers, etc.). The system 104 may format and generate reports based upon some or all of the information received from the devices 120, 122 (e.g., user accident reports, location information, user requests for services, other information discussed herein, etc.). The reports may be transmitted to one or more recipients (e.g., attorneys, government entities, etc.).

Figure 2:
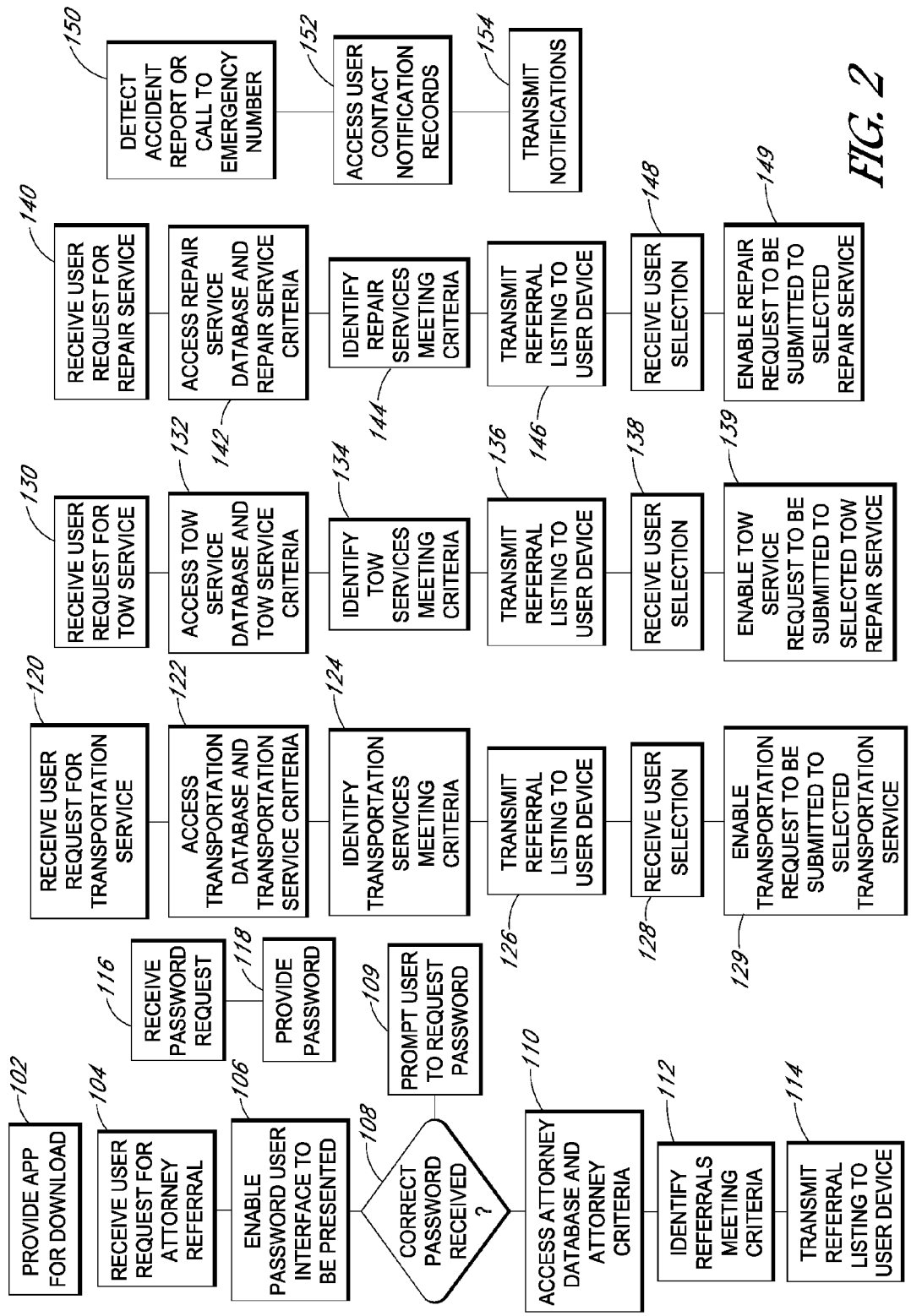
FIG. 2 illustrates example processes.

FIG. 2 illustrates several example processes, one or more of which may occur if a user is in an accident. It is understood that the various processes may occur in any order. For example, the process of requesting transportation services may occur before or after requesting an attorney referral. In addition, some or all of the process stages may be performed on a user device (e.g., via a dedicated application) or by a remote system, such as the accident communication processing system discussed above, or a combination of the user device and the remote system. At state 102, an application may be provided for download to a user device, such as a mobile phone. This state may occur prior to the user being in an accident, or the user may download the app after the accident occurs. The application ("app") may perform some or all of the functionality described herein.

An example attorney referral process will now be described. At state 104, the user requests, by activating a corresponding referral request control provided by the app, an attorney referral. At state 106, a password user interface is optionally presented by the app. At state 108, the password is received and a determination is made (e.g., by the app or by the remote system) as to whether the correct password was entered by the user and received. Optionally, the remote system (e.g., system 104 discussed above) will inhibit transmission of the attorney referral information to the app unless the user enters a password or other authentication measure via the app or the user device generally. Optionally, the user may be required to call and/or text a phone number in order to request a password. Thus, at state 109, the user may be prompted to request a password (e.g., a code). At state 116, the system receives a password request (e.g., via a voice or text request). At state 118, the system provides the user with a password (e.g., via voice or text).

If the correct password is received, the process proceeds to state 110, where the system accesses a database of attorney records and attorney referral criteria. For example, the attorney referral criteria may include some or all of the following: practice specialty, location relative to a user's current location and/or home location (e.g., accessed from the user's account information), performance ratings provided by the system operator, performance ratings provided by other users, ratings/feedback provided by a state bar, ratings/feedback provided by an independent rating agency, whether the attorney has retained advertising rights for the user's current location and/or home location, an indication as to the type of accident the user is reporting (e.g., whether the user is reporting a vehicular accident, a workplace accident, injury, or a personal accident, so an attorney with a particular skill or specialty corresponding to the accident type may be selected) other information provided by the user, and/or other criteria.

At state 112, the system may use the information from the attorney records, optionally from the user device (e.g., location information), and optionally from the user's profile information, to select one or more attorneys to refer the user to. At state 114, information (e.g., contact information, rating information, and/or other information accessed from the database) regarding one or more of the selected attorneys may be transmitted to the user for presentation by the app on the user's device. Optionally, the user may select a given listed attorney, and the system may facilitate communication between the user and the attorney. For example, the system may transmit some or all of the information provided by the user regarding the accident to the selected attorney, and may provide the user's contact information (e.g., mobile device phone number) so that the attorney can contact the user. Optionally, the system may also enable the user to call the selected attorney by activating a call link presented by the app in conjunction with the attorney referral.

An example transportation referral process will now be described. If, at state 120, the user requests a referral to a transportation service, the process proceeds to state 122. The system accesses a database of transportation service provider (e.g., taxi companies) records and transportation service provider referral criteria. For example, the referral criteria may include one or more of the following: the location of the service or the services' taxis relative to the user's current location (e.g., within a specified or determined range, such as 1 mile, 2 miles, or other distance, where the range is optionally specified by the system operator for a given service provider or class of service providers via an administrative user interface) or home location (as provided by the user when registering with the system), rates, performance ratings provided by the system operator, ratings provided by other users, ratings/feedback provided by a state agency, ratings/feedback provided by an independent rating agency, which service has retained advertising rights for the user's current location and/or home location, and/or other criteria. At state 124, the system may use the information from the records, optionally from the user device (e.g., location information), and optionally from the user's profile information to select one or more transportation services to refer the user to. At state 126, information (e.g., contact information, rating information, and/or other information accessed from the database) regarding one or more of the selected transportation may be transmitted to the user for presentation by the app on the user's device.

At state 128, the user's selection of a listed transportation service may be received. At state 129, the system or app enables a transportation request to be submitted to the user-selected transportation service. For example, the app or system may transmit a transportation request message to the user selected transportation service. The user selected transportation service may be provided with the request via a user interface (e.g., on an administrative portal), the request optionally including some or all of the following: the user's current location (as determined from location information received from the user device), the user's desired destination, and contact information for the user (e.g., a phone number associated with the user device, an email address, etc.). The transportation service may then send a vehicle to pick up the user at the corresponding location. Optionally, the user is requested to confirm the pickup occurred and to rate the transportation service, and such confirmation (or lack thereof) and review may be stored by the system. The confirmation or lack thereof may be used by the system in rating the transportation service.

An example tow service referral process will now be described. If, at state 130, the user requests a referral to a tow service, the process proceeds to state 132. The system accesses a database of tow service provider records and tow service provider referral criteria. For example, the referral criteria may include one or more of the following: the location of the service or the services' tow trucks relative to the user's current location (e.g., within a specified or determined range, such as 1 mile, 2 miles, or other distance, where the range is optionally specified by the system operator for a given service provider or class of service providers via an administrative user interface), home location (as provided by the user when registering with the system) or the location of a repair shop (e.g., a repair show selected or specified by the user), rates, performance ratings provided by the system operator, ratings provided by other users, ratings/feedback provided by a state agency, ratings/feedback provided by an independent rating agency, which service has retained advertising rights for the user's current location and/or home location, and/or other criteria. At state 134, the system may use the information from the records, optionally from the user device (e.g., location information), and optionally from the user's profile information to select one or more tow services to refer the user to. At state 136, information (e.g., contact information, rating information, and/or other information accessed from the database) regarding one or more of the selected tow services may be transmitted to the user for presentation by the app on the user's device.

At state 138, the user's selection of a listed tow service may be received. At state 139, the system or app enables a tow request to be submitted to the user-selected tow service. For example, the app or system may transmit a tow request message (e.g., provided to the user selected tow service via an administrative portal user interface and/or via a text message to the user selected tow service), the request optionally including one or more of the following: the user's current location (e.g., as determined from location information received from the user device), the user's desired destination for the user's vehicle, and contact information for the user (e.g., a phone number associated with the user device, an email address, etc.). The transportation service may then send a tow vehicle to pick up the user vehicle at the corresponding location. Optionally, the user is requested to confirm the tow occurred and to rate the tow service, such confirmation (or lack thereof) and review may be stored by the system. The confirmation or lack thereof may be used by the system in rating the tow service.

An example repair service referral process will now be described. If, at state 140, the user requests a referral to a vehicle repair service (e.g., a body shop), the process proceeds to state 142. The system accesses a database of repair service provider records and repair service provider referral criteria. For example, the referral criteria may include, the location of the relative to the user's current location (e.g., within a specified or determined range, such as 1 mile, 2 miles, or other distance, where the range is optionally specified by the system operator for a given service provider or class of service providers via an administrative user interface) or home location (as provided by the user when registering with the system), rates, ratings provided by other users, ratings/feedback provided by a state agency, ratings/feedback provided by an independent rating agency, which service has retained advertising rights for the user's current location and/or home location, and/or other criteria. At state 144, the system may use the information from the records, optionally from the user device (e.g., location information), and optionally from the user's profile information to select one or more repair services to refer the user to. At state 146, information (e.g., contact information, rating information, and/or other information accessed from the database) regarding one or more of the selected repair services may be transmitted to the user for presentation by the app on the user's device.

At state 148, the user's selection of a listed tow service may be received. Optionally, a field is provided via which the user can provide a description of the damage to the user's vehicle. At state 149, the system or app enables a repair request to be submitted to the user-selected repair service. For example, the app or system may transmit a service request message to the user selected repair service (e.g., provided to the user selected repair service via an administrative portal user interface and/or via a text message to the user selected repair service), the request optionally including some or all of the following: the user's current location (as determined from location information received from the user device), the user's description of the damage to the user's vehicle, and contact information for the user (e.g., some or all of the following: a phone number associated with the user device, an email address, etc.). The repair service may optionally then send a confirmation message to the user (optionally via the system), confirming the request was received, and optionally provide an estimate on how long it will take to repair the vehicle (e.g., a completion date). Optionally, the repair service calls or texts the user to coordinate the repair and related logistics. Optionally, the user is requested to rate the repair service, where the request may optionally be provided to the user (e.g., via the app, email, or text message) after the estimated completion date.

As noted above, the application and/or system may be configured to detect an accident event and to notify contacts specified by the user regarding the accident. For example, at state 150, the application or the remote system may detect that the user has initiated a call to an emergency service (e.g., to a 911 number) or is reporting an accident (as described elsewhere herein). At least partly in response, the process may proceed to state 152, and contact notification records, previously defined by the user, may be accessed. The contact notification records may include the names and contact information (e.g., mobile phone number, landline phone number, and/or email address) of people or companies who should be notified if an accident involving the user occurs. At state 154, the notifications may be transmitted to the contact.

Figure 9:
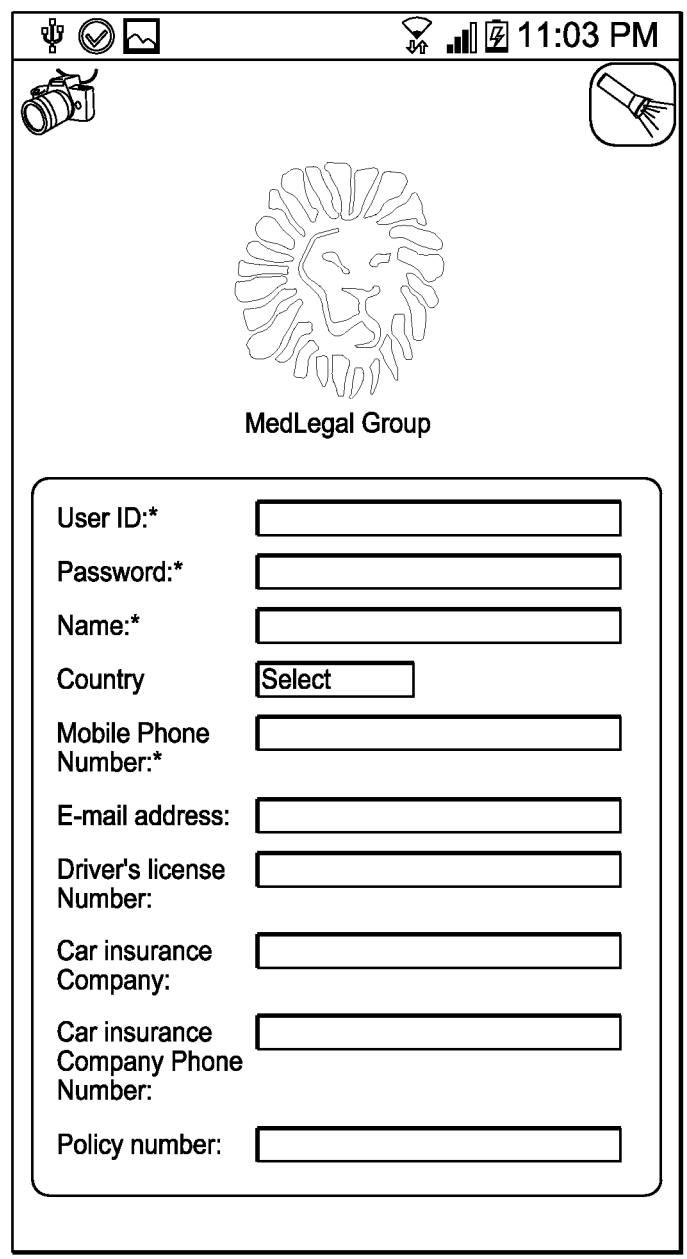
FIG. 9 illustrates an example user interface.

A user may register with the system 104 before or after downloading the app (and optionally the user may be able to register via a registration interface provided by the app). As part of the registration process, the user may provide information such as some or all of the following: a user ID, a user password, the user's name, country, home address, business address, email address, SMS address, mobile phone number, landline address, driver's license number, car license plate number, insurance provider, insurance provider contact information, insurance policy number, and/or other information, including other information that may be useful in the event of an accident. An example registration user interface is illustrated in FIG. 9.

Figure 3A:
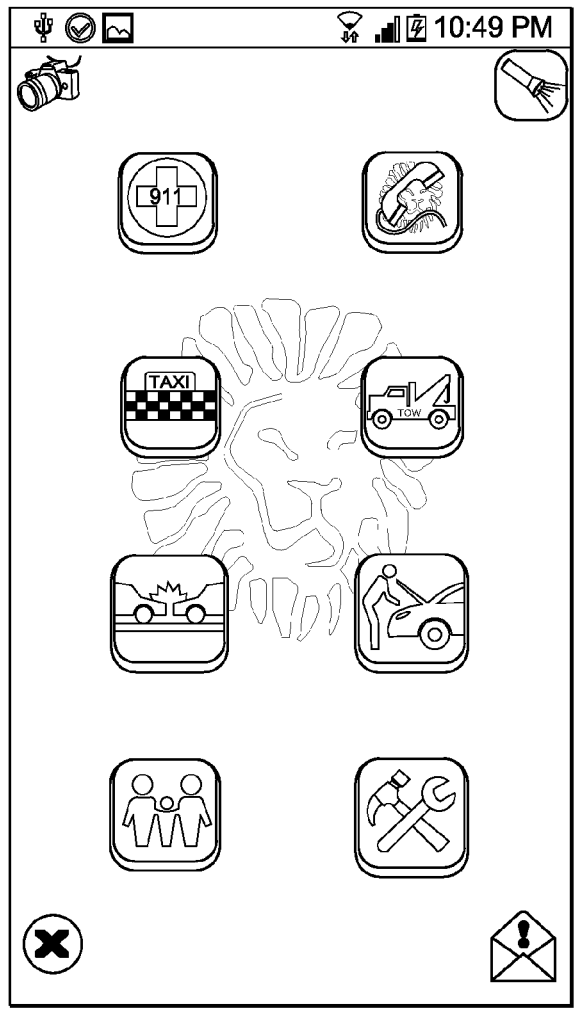
FIGS. 3A-3I illustrate example user interfaces.

The app may provide one or more screens comprising user interfaces. For example, a home screen, such as that illustrated in FIG. 3A, may be provided that includes an emergency communication control, which when activated causes the user terminal to establish a communication channel (e.g., voice, text, or otherwise) with an emergency service provider (e.g., police and/or ambulance), a control to initiate communications, controls to access referrals to one or more of taxi services, tow truck services, repair services, etc. A control may also be provided which enables a user to access a service via which the user can identify one or more contacts who are to be notified in the event an indication is received that the user has been involved in an accident.

Figure 3B:
Figure 3B:
Figure 3B:
Figure 3B:
Figure 3B:

The home screen may also include one or more tools controls, as illustrated in greater detail in FIG. 3B. A personal data control may be provided enabling the user to access and edit profile information of the user. A photo control may be provided, which when activated causes, causes photograph controls to be provided for display via which the user can cause the user terminal to capture photographs and/or videos of the accident, participants, witnesses, and/or of documents (e.g., of the driver's license or insurance card of the other party involved in the accident), and store the photographs/videos in memory in association with time/date and location information (e.g., GPS location information). The photographs/videos and/or associated information may be transmitted to the remote system. A flashlight control may be provided which when activated causes a light on the user terminal to illuminate for purposes of taking a picture, for viewing documents, such as insurance card information, etc. A message control may be provided via which the user can view messages to the user from contacts to whom accident notifications have been transmitted to on behalf of the user (e.g., messages responding to the accident notification). A session end control may optionally be provided, which when activated by the user causes the application to close. The photo control and/or the flashlight control may be provided on some or all the other user interfaces discussed herein.

Figure 3C:

User activation of the emergency communication control may cause the user terminal to initiate a call to a 911 number. Optionally, activation of the emergency communication control causes a user interface, such as that illustrated in FIG. 3C, to be presented. The example user interface illustrated in FIG. 3C includes a phone address field prepopulated with an emergency phone number (911 in this example). The user can activate a call command control and the emergency phone number will be dialed, or the user can manually enter a number to be called, or the user can access a number to be called from the user's contact list (e.g., a "favorites" contact list).

Referring back to FIG. 3A, the home screen may also include an accident communication processing system control, which when activated may present the user with several communication options, such as the option to initiate a call/voice communication with a voice recognition system associated with the accident communication processing system or a human agent, the option to initiate a text message communication with a text parsing system associated with the accident communication processing system or a human agent, or a professional, such as a lawyer (e.g., a personal injury lawyer that handles accident related claims for victims), associated with the accident communication processing system. The accident communication processing system control will be discussed in greater detail elsewhere herein.

Figure 3D:
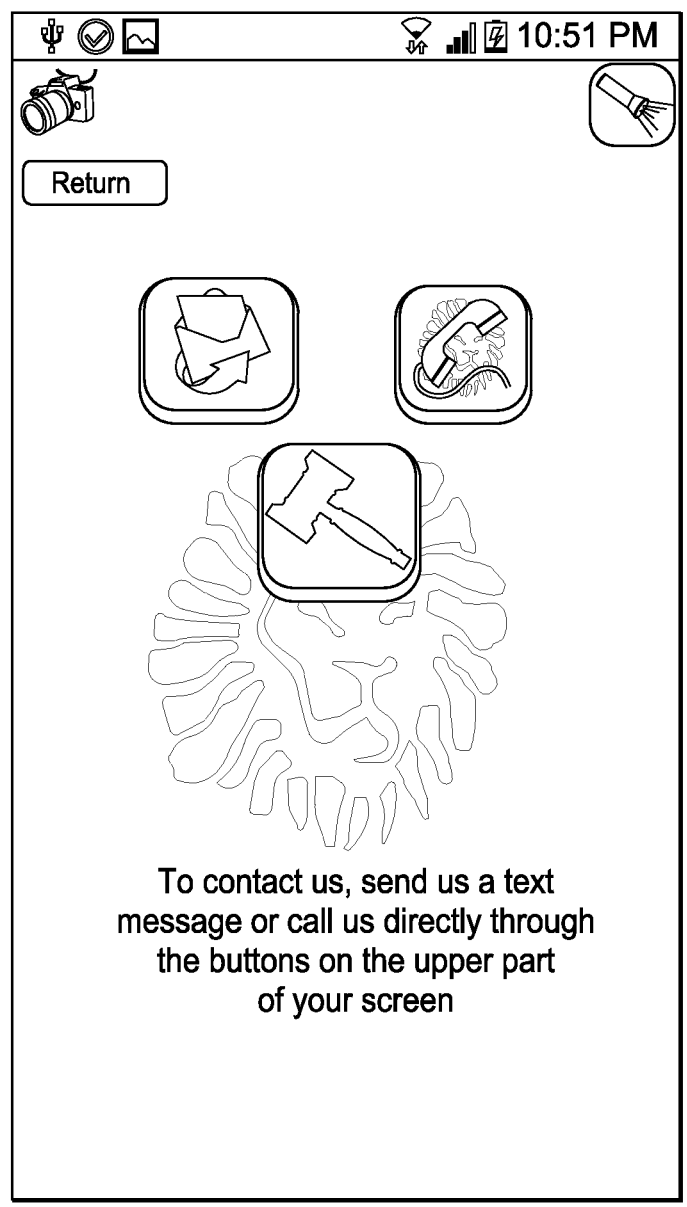

If the user activates the accident communication processing system control, a user interface, such as that illustrated in FIG. 3D, may be presented. A text message control is provided, which when activated causes a text message interface to be provided for display via which the user can enter and transmit a text message related to the accident to the remote system. A toll free voice control is provided, which when activated causes a toll free call to be placed via the user terminal to the remote system or a human agent associated with the remote system, enabling the user to report the accident and initiate an accident handling process. An attorney control is provided which when activated causes an agency or attorney user interface, such as that illustrated in FIG. 3E, to be presented on the user terminal.

Figure 3E:
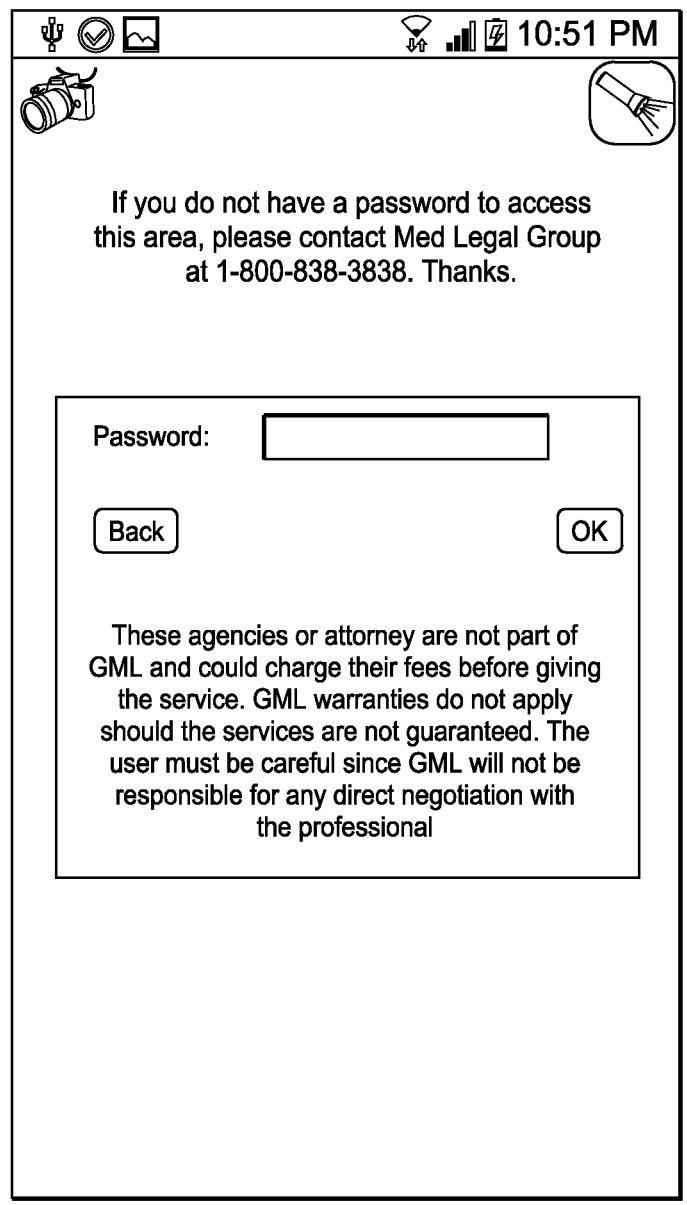

Referring to FIG. 3E, a password field is provided via which the user is to enter a password in order to access certain additional related user interfaces, such as those related to attorney referrals. In this example, the user is instructed to contact the remote system or an agent associated with the remote system via voice and/or text message to obtain the password, although the password may be provided using other techniques. The user is optionally informed that the agencies or attorneys being referred to or listed are not employees or contractors of the system operator and the agencies or attorneys may charge for their service and the system operator is not guarantying the performance of the agency or attorney. At least partly in response to the user entering the correct password, the app displays one or more additional interfaces.

Figure 3F:
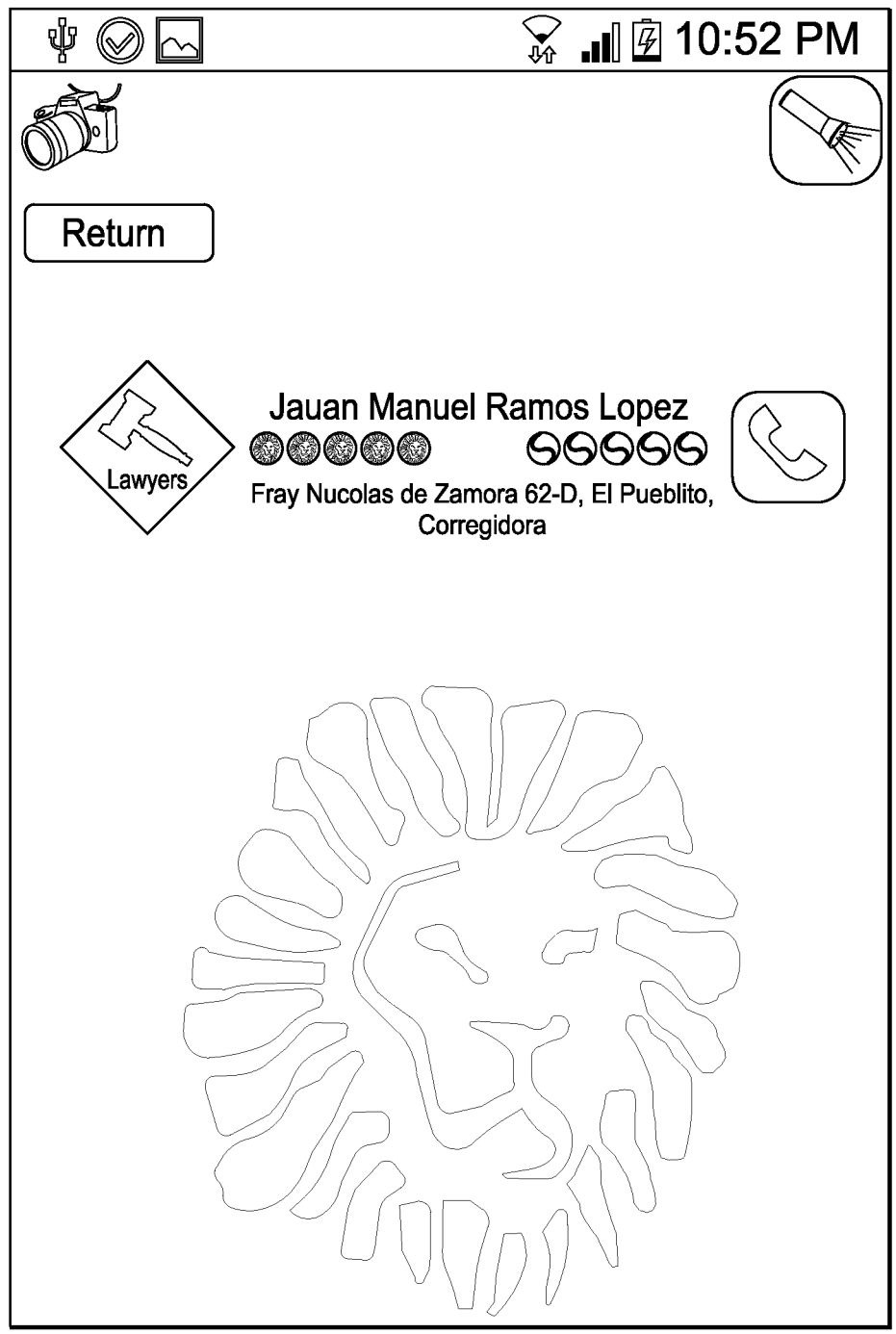

For example, the user interface illustrated in FIG. 3F may be presented, providing one or more entries including the name and optionally contact information (e.g., phone number, email address, physical address, etc.) of one or more agencies and/or attorneys that handle accident claims to whom the user may be referred to. The entries may be dynamically generated by the remote system, and transmitted from the remote system to the user terminal for display via the user interface. Optionally, a given entry may include rating information (e.g., a star rating, a point rating, a ranking relative to the agencies or attorneys, etc.) providing an indication as to the attorney's/agency's past performance. Optionally, a call control is provided in association with an entry which when activated by the user causes a call to be placed to a corresponding agency or attorney. The call may be routed via the system. For example, activation of the call control may cause the user terminal to place a call to the system, and the system will place an outcall to the agency or attorney, and then bridge the call from the user terminal and the outcall. Optionally instead, activation of the call control may cause the system to place a first outcall to the user terminal and a second outcall to the agency or attorney, and then bridge the first outcall and the second outcall (other calls placed via the app may optionally be similarly routed through the system). Optionally instead, activation of the call control may cause the user terminal to directly call a phone address associated with the agency or attorney. Other calls initiated via the app may be similarly routed using one or more of the foregoing techniques or other techniques. The system may record information regarding each call, optionally including an identification of which user initiated the call, from which terminal, to whom (and to what phone address) the call was placed, an indication as to whether the call was successfully completed, and/or the date/time of the call.

The attorney(s) or agency(ies) presented via the user interface may have been dynamically selected and/or presented in ranked order by the system based on one or more criteria. For example, the criteria may optionally include one or more of the following: a determined practice specialty, location relative to the user's current location and/or home location (e.g., accessed from the user's account information), performance ratings provided by the system operator, performance ratings provided by other users, ratings/feedback provided by a state bar, ratings/feedback provided by an independent rating agency, whether the attorney has retained advertising rights for the user's current location and/or home location, and/or other criteria.

Optionally, a bar call control is provided which, when activated, causes a call to be initiated to the state bar or a state bar-sponsored referral entity corresponding to the user's location. The state bar or state bar-sponsored referral entity may then optionally refer the user to an attorney.

Figure 3G:

Referring back to FIG. 3A, a transportation control may be provided to obtain transportation information and/or initiate communication with a transport provider. For example, activation of the transportation control may cause a user interface to be provided for display, such as that illustrated in FIG. 3G, providing a listing of taxi services (and/or other transportation options) that have a taxi/vehicle in the vicinity of the accident (e.g., as determined by location information (e.g., GPS or Wi-Fi location information) obtained from the user's terminal, and from location information associated with the taxis). Optionally, the user interface may display, for the listed transportation services, their rates and/or an estimated time for the taxi to reach the user location, and optionally ratings (e.g., overall satisfaction ratings, timeliness ratings, etc.) provided by previous users and/or the system operator, are displayed on the user terminal. The listing may be dynamically generated by the remote system, and transmitted from the remote system to the user terminal for display via the user interface. Optionally, the user interface may enable the user to enter a desired destination, which may be transmitted via the system to the listed taxi services or just a selected taxi service in conjunction with the user's phone number and/or other information. Optionally, the taxi service may call the user using the contact information to coordinate the pick-up.

Optionally, the taxi services may provide a set fee for transporting the user from their current location to the specified location. The set fee may be communicated to the user via the app, telephone voice call, or otherwise. The user may then select via the user interface a taxi service to order the taxi (e.g., via a text communication provided by the user or the system or via a voice communication by activating a call control provided via the user interface). The listed taxi services may be dynamically selected by the system or system operator based at least in part on one or more of the following: the location of the service or the services' taxis relative to the user's current location (e.g., within a specified or determined range, such as 1 mile, 2 miles, or other distance) or home location (as provided by the user when registering with the system), performance ratings provided by the system operator, ratings provided by other users, ratings/feedback provided by a state agency, ratings/feedback provided by an independent rating agency, which service has retained advertising rights for the user's current location and/or home location, and/or other criteria.

Figure 3H:

A tow service control may be provided to obtain towing service information and/or initiate communication with a towing service provider. For example, activation of the tow service control may cause a user interface to be provided for display, such as that illustrated in FIG. 3H, optionally including one or more of the following: a listing (e.g., dynamically generated by the remote system) of tow services that have a tow truck in the vicinity (e.g., within a predetermined or determined range) of the accident (e.g., as determined by location information (e.g., GPS or Wi-Fi location information) obtained from the user's terminal, and from location information associated with the tow trucks), and optionally their rates and/or an estimated time for the tow truck to reach the user location, and optionally ratings (e.g., overall satisfaction ratings, timeliness ratings, etc.) provided by previous users and/or the system operator. Optionally, the user interface may enable the user to enter a desired destination, which may be transmitted via the system to the tow services or just a selected tow service. Optionally, the tow services may provide a set fee for towing the user vehicle from its current location to the specified location, which may then be communicated to the user via the app, a voice call, or otherwise. The user may then select via the user interface a tow service to order the tow truck (e.g., via a text communication provided by the user or the system or via a voice communication initiated by activating a call control). The listed tow services may be dynamically selected by the remote system based at least in part on one or more of the following: the location of the service or the services' tow trucks relative to the user's current location or home location (accessed from the user's account information), selected repair service location, ratings provided by other users, ratings/feedback provided by a state agency, ratings/feedback provided by an independent rating agency, which service has retained advertising rights for the user's current location and/or home location, and/or other criteria.

A repair/mechanics services control may be provided to enable the user to obtain body/mechanical repair service information and/or initiate communication with a body/mechanical repair service provider. For example, activation of the a body repair/mechanics services control may cause a user interface to be provided for display including a listing of body repair/mechanics services (provided by the remote system) within a predetermined or user specified distance from the user's current location, optionally their rates (which may be entered by the system operator), and optionally ratings (e.g., performance ratings provided by the system operator, overall satisfaction ratings, timeliness ratings, cost ratings, quality of repair ratings, etc.) provided by previous users. The user may then select via the user interface a repair service, and optionally the service selection is communicated to the selected repair service (e.g., via the system). The listed repair/mechanics services may be dynamically selected based at least in part on the location of the services relative to the user's current location and/or home location (accessed from the user's account information), ratings provided by other users, ratings/feedback provided by a state agency, ratings/feedback provided by an independent rating agency, which service has retained advertising rights for the user's current location and/or home location, and/or other criteria.

Optionally, if the system determines it cannot automatically identify a referral meeting corresponding referral criteria for a given service in response to a user request, the system may automatically transmit a notification to the user and/or a human operator. If there are no service options (e.g., no transportation service, tow service, repair service, no attorney that meet corresponding criteria), the system may automatically transmit a message to be presented via the user interface, stating that a representative associated with the system will contact (e.g., by voice call or text) the user to coordinate the service. The human operator may manually attempt to identify a service provider and contact the manually identified service provider to order service for the user.

A notification control is provided via which the user can enter contact information (e.g., a phone number, an SMS address, an email address, etc.) for one or more persons/entities (e.g., family, friends, employer, etc.) who are to be automatically notified by the system in the event the user reports an accident via the system, or optionally, when the user reports an accident, the list of previously contact is presented to the user and the user can select one or more contacts to whom a communication is to be provided. Optionally, after the user initially enters contact information for a given person, a notification is sent to the person, using an item of communication information entered by the user (e.g., an email or SMS address), asking the person to agree to accept accident notifications by activating a control (e.g., a link in the request or by sending an acceptance message) and/or ask the person to download and install the app on their device(s) and to cross-refer to the user. Optionally, if the person declines to accept accident notifications, the user may be so informed, and accident notifications will not be provided to that person. Optionally instead, a contact is not provided an opt-out option. The user may also remove a person from the notification contact list and/or edit a given entries' contact information via a corresponding user interface. The foregoing functionality is described in greater detail with respect to FIGS. 8A-8AC.

Figure 3I:
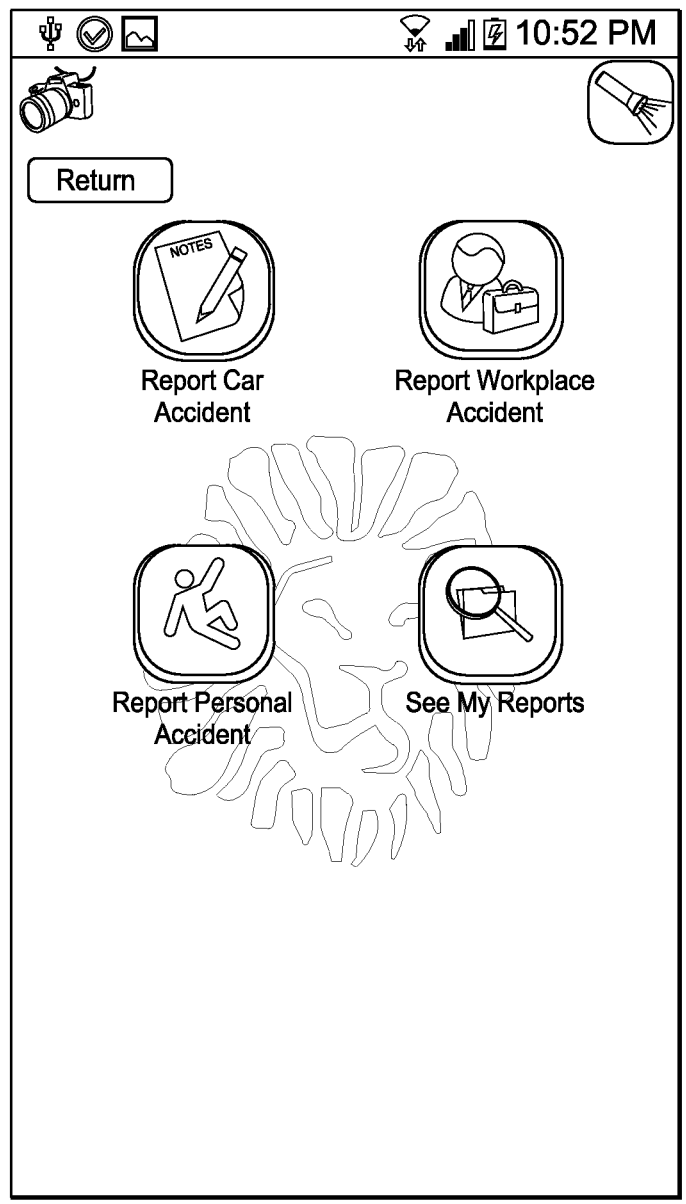

An accident report service control is provided via which the user can indicate the type of accident (e.g., vehicle/traffic; personal (e.g., resulting from unsafe conditions in a retail establishment, an apartment building, etc.); workplace, etc.) and provide a report verification. Activation of the accident report service control may cause example the user interface illustrated in FIG. 3I to be presented. In the example user interface illustrated in FIG. 3I, controls are provided to report different types of accidents. For example, the user interface may include controls to report a car accident, report a workplace accident, and report a personal accident. In addition, a control may be provided via which the user can access reports on accidents reported by the user. Controls may optionally be provided via which the user can access photograph controls and flashlight controls, such as those discussed elsewhere herein. Depending on the control activated, the app (or the system) selects a corresponding sequence of user interfaces to be presented to the user.

For example, if the user activates a car accident control, the example user interfaces illustrated in FIGS. 4A-K may be presented. If the user activates a workplace accident or injury control, the example user interfaces illustrated in FIGS. 5A-5F may be presented. For example, if the user activates a personal accident control, the example user interfaces illustrated in FIGS. 6A-6B may be presented. Some or all of the information collected via the various user interfaces may be transmitted and reported directly or indirectly to an attorney (e.g., via an attorney accessible administrative portal presented on an attorney terminal and controlled by the system operator which provides associated data to the attorney) selected by the user via a user interface described elsewhere herein (optionally in substantially real time after the user enters the information and selects the attorney).

Figure 7A:
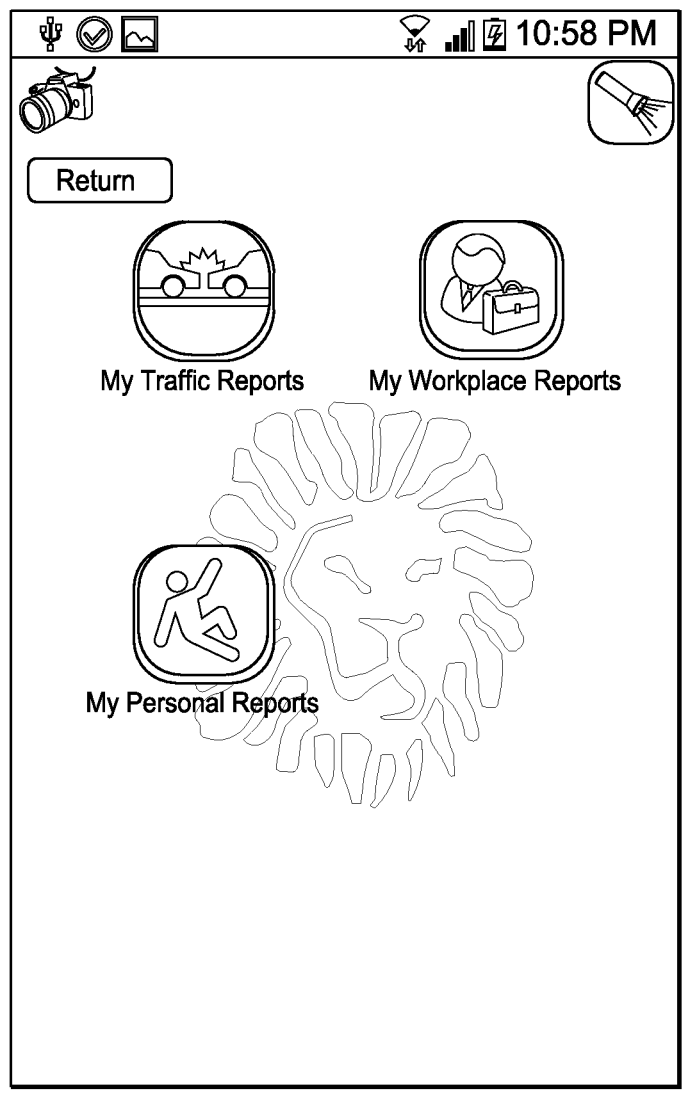
FIGS. 7A-7C illustrate example user interfaces.
Figure 7B:
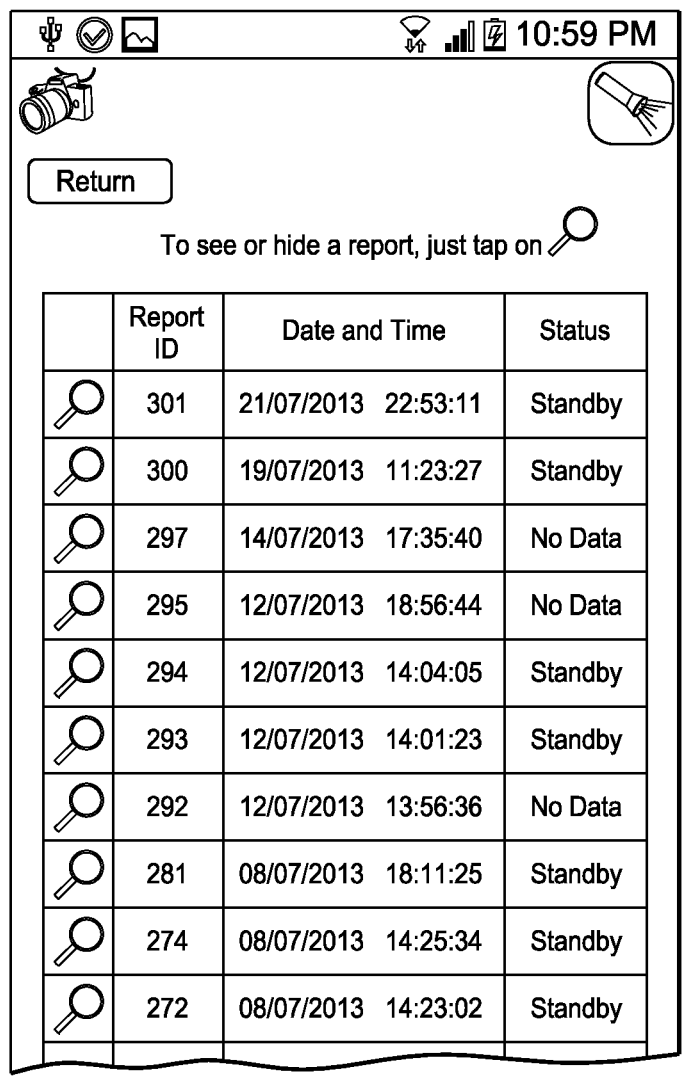
Figure 7C:
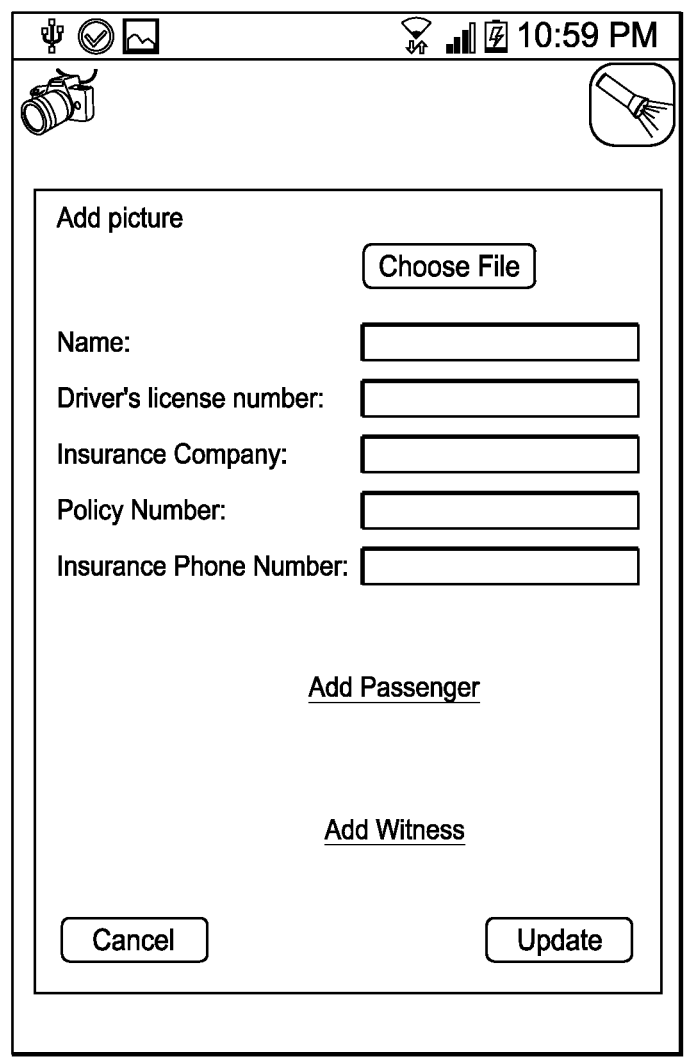

If the user activates a report control, the user interface illustrated in FIGS. 7A-7C will be presented to the user terminal.

Figure 4A:
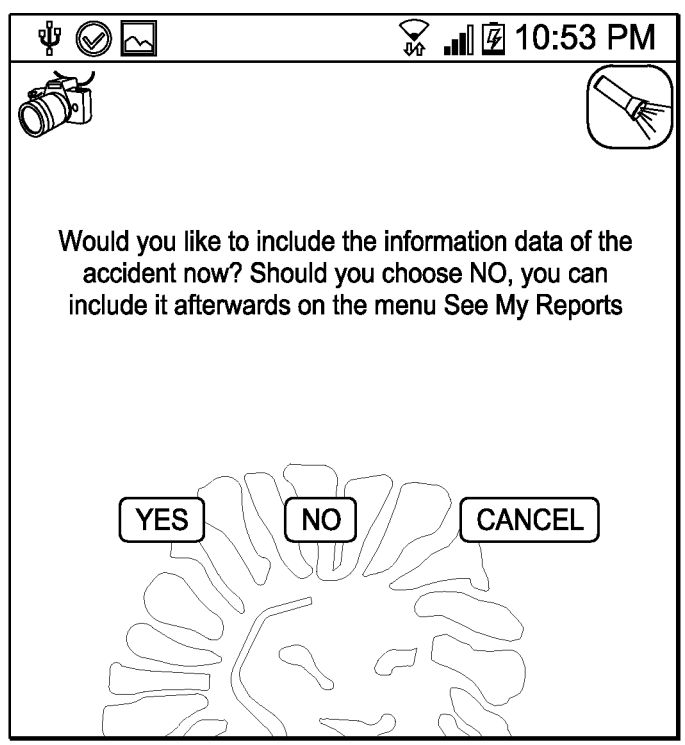
FIGS. 4A-4K illustrate example user interfaces.
Figure 4B:
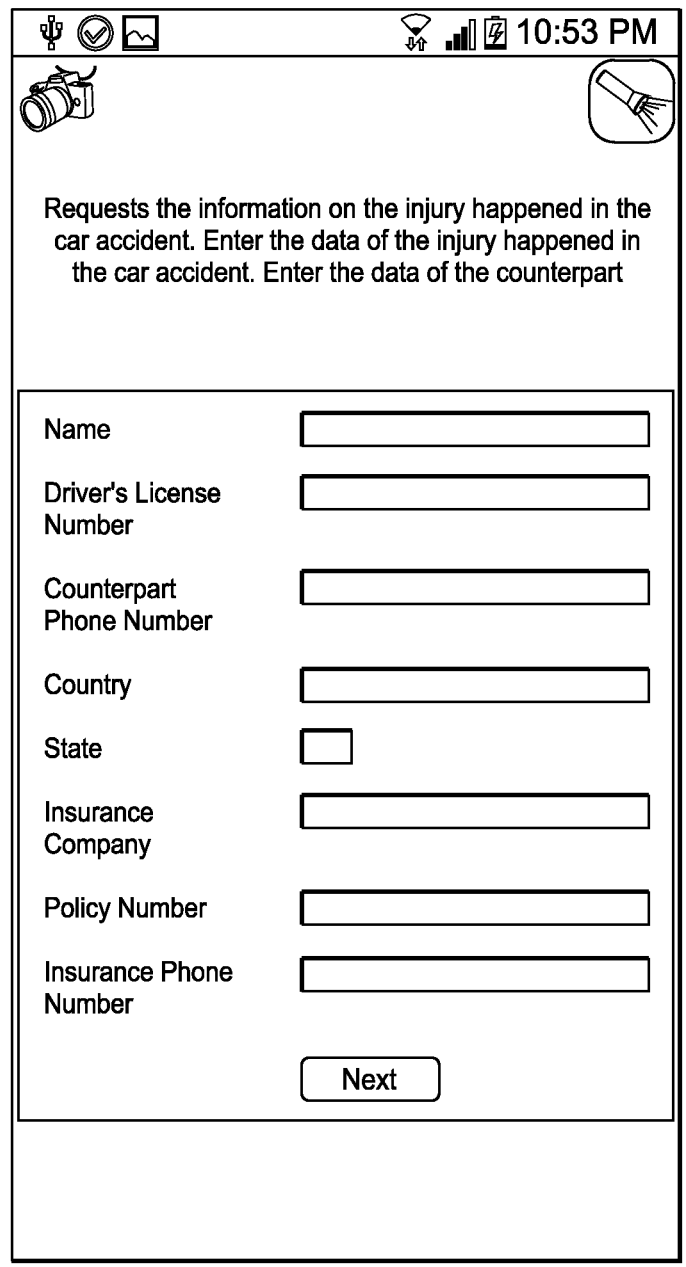

The car accident user interfaces (which may be used to report car, truck, bus, motorcycle, or other vehicular accidents) will now be discussed with reference to FIGS. 4A-K. The example user interface illustrated in FIG. 4A asks the user to indicate (e.g., by activating a corresponding user control) whether the user wants to: provide a complete report regarding the car accident via the app; have the system or an agent associated with the system contact the user (e.g., via a voice call) to collect the and enter the report information; or cancel the report altogether. If the user activates a control indicating that the user wants to provide the accident report via the app, the example user interface illustrated in FIG. 4B may be presented. Referring to FIG. 4B, fields are provided via which the user can enter information regarding the other party involved in the car accident. For examples, fields may be provided configured to receive some or all of the following information of the other party: name, driver's license number, phone number, country, state (or address information), insurance company, insurance policy number, insurance company phone number, vehicle license plate number, vehicle make, vehicle model, whether the other party was injured, and/or other information. Once the user activates an enter control, the user interface illustrated in FIG. 4C may be presented.

The example user interface illustrated in 4C prompts the user to indicate if there were any passengers (non-drivers) in the vehicle(s) involved in the accident, and if so to enter the number of passengers. If the user indicated that there were passengers, the example user interface illustrated in FIG. 4D may be presented, prompting the user to enter passenger information for each passenger, such as name, age, contact information (e.g., some or more of the following: phone number, email address, physical address, etc.). Optionally, the app may repeatedly (for as many times as the number of witnesses indicated by the user) display the user interface illustrated in FIG. 4D and receive the corresponding passenger data. Optionally, fields may be provided enabling the user to indicate if any of the passengers were injured or claimed they were injured. The user may also be prompted to indicate if any pedestrians were injured in the accident, and if so, may be prompted to provide information regarding the injured pedestrians (e.g., name, contact information, type of injury, etc.)

Figure 4C:
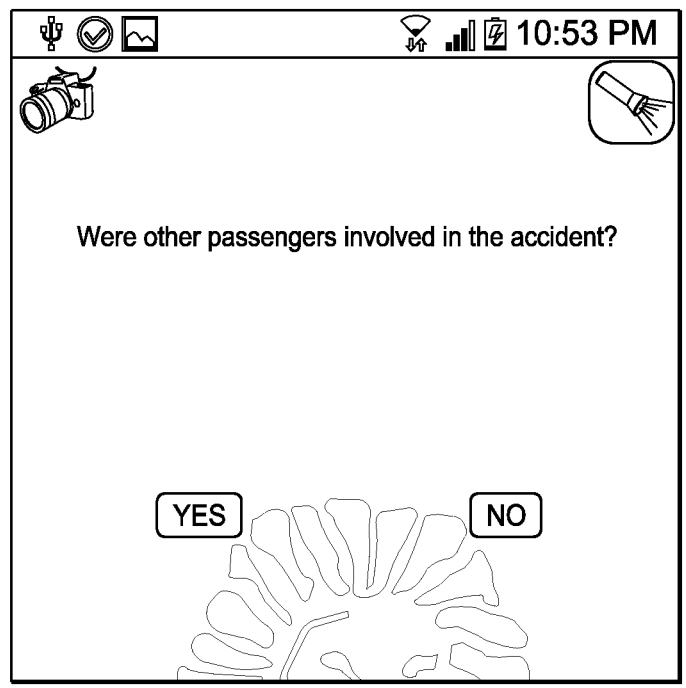
Figure 4D:
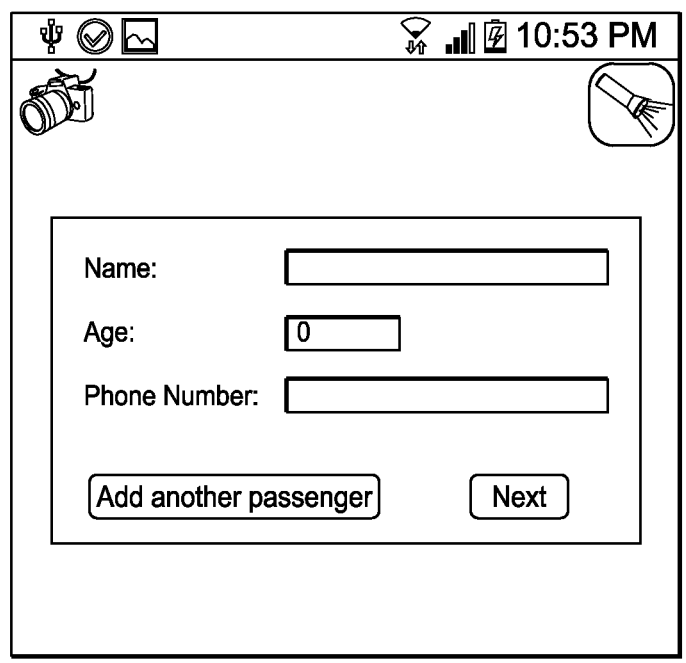
Figure 4E:
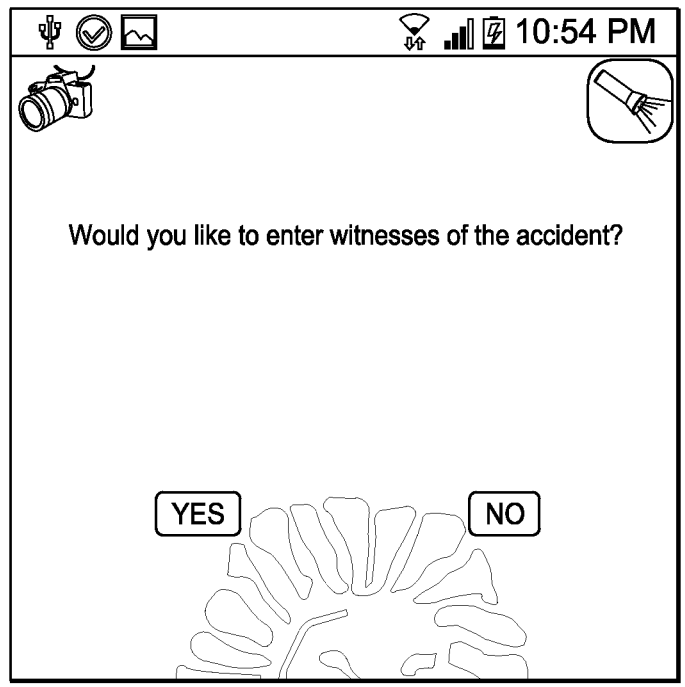
Figure 4F:
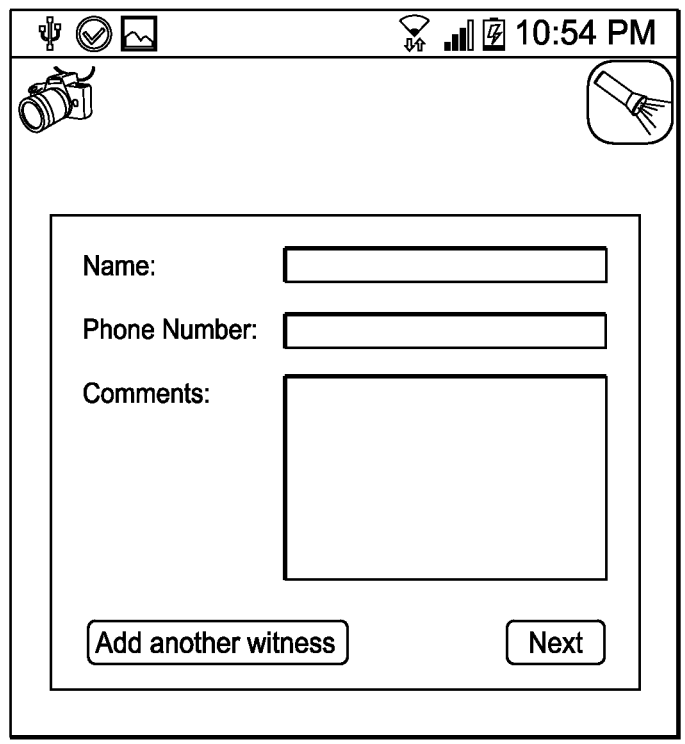

Optionally, the user may be prompted, via the example user interface illustrated in FIG. 4E, to indicate whether there are witnesses to the accident, and if so, fields are provided via the example user interface illustrated in FIG. 4F, via which the user can enter witness information via respective fields, such as some or all of the following: name, age, contact information (e.g., phone number, email address, etc.). The user may be prompted to indicate whether there are additional witnesses, and if so, additional fields are provided via which the user can enter information for additional witnesses.

Figure 4G:
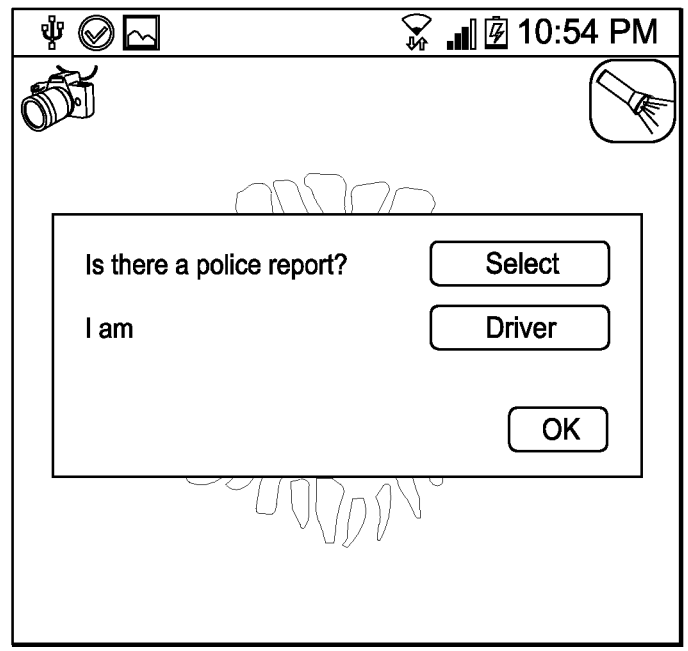
Figure 4H:
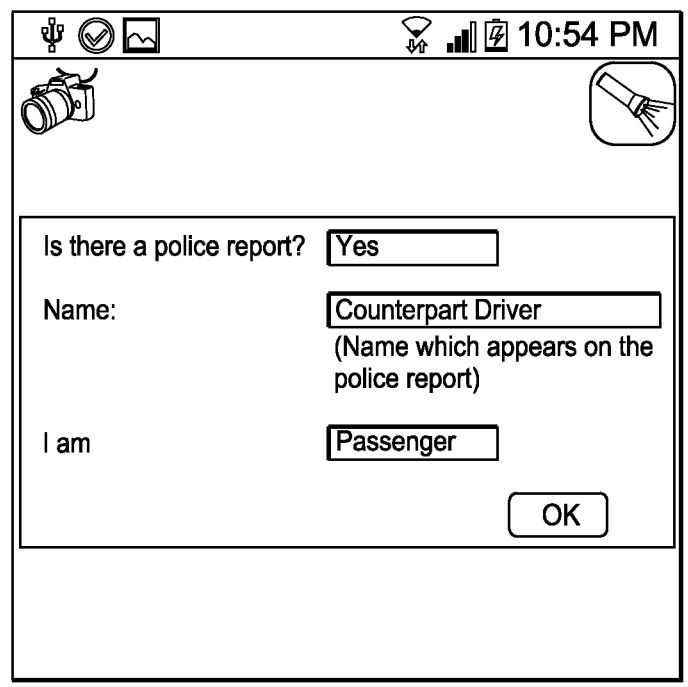
Figure 4I:
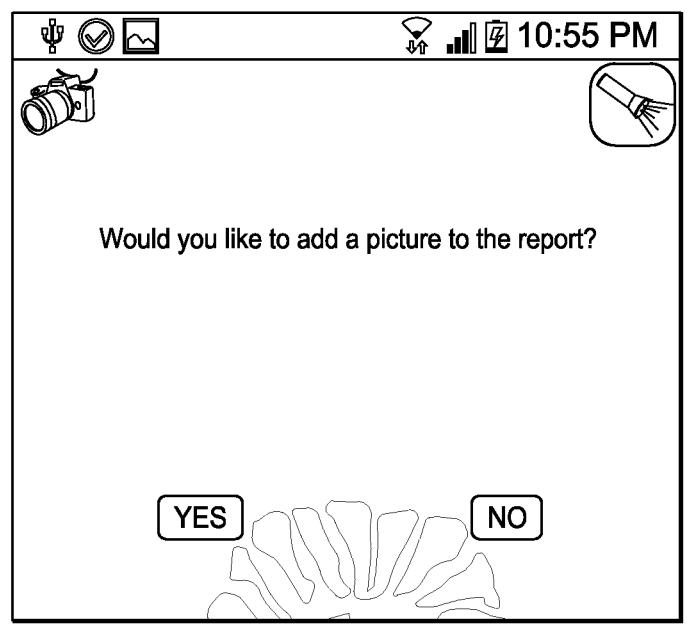
Figure 4J:
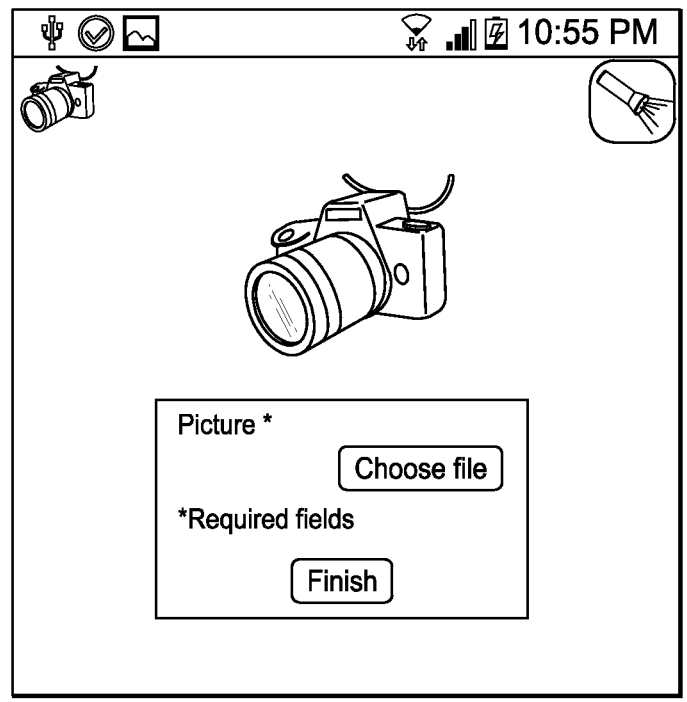
Figure 4K:
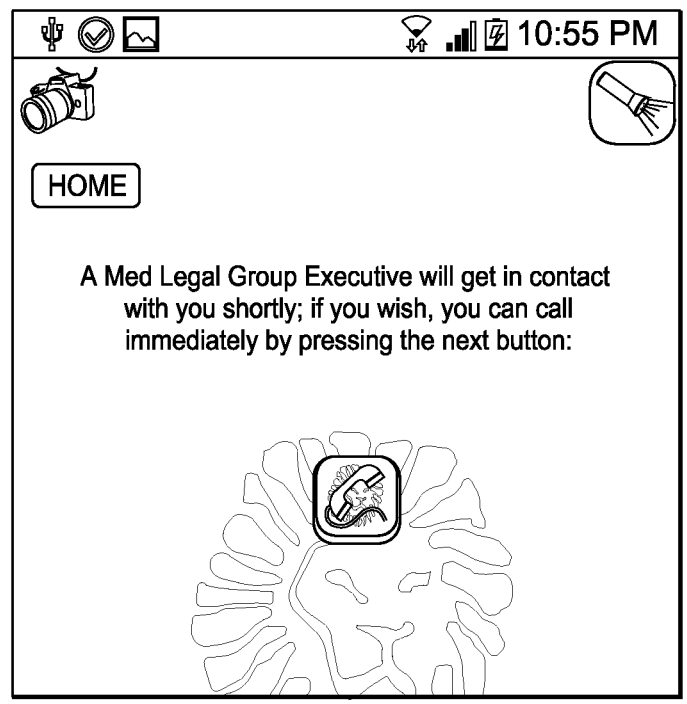

The example user interface illustrated in FIG. 4G prompts the user to indicate whether there is a police report for the accident and prompts the user to indicate whether the user is a driver or a passenger. In the example user interface illustrated in FIG. 4H, the user has indicated that a police report has been made, has indicated that the driver of the other vehicle is the first listed driver on the police report. The example user interface illustrated in FIG. 4I asks the user if the user wants to enter a photograph and/or video related to the accident (e.g., a photograph of the accident, and interview with a witness, etc.). The user can respond yes or no. If the user indicates that a photograph and/or video are to be taken, the example user interface illustrated in FIG. 4J may be presented. The user may optionally take a photograph and/or a video, or select a previously captured photograph or video. The user may then indicate that the photograph/video is to be included in the report. The example user interface illustrated in FIG. 4K may then be presented. A car map or template (e.g., showing an outline of one or more of: the left side of a vehicle, the right side of the vehicle, the front of the vehicle, the rear of the vehicle, the top of the vehicle, the bottom of the vehicle), may be provided via which the user can mark (e.g., by touching the damaged areas, using "Xs", colors, or otherwise) portions of the car to indicate the areas in which the vehicle is damaged. The user information may be transmitted to the remote system. The user may also be prompted to indicate whether the user suffered an injury in the accident, and if so, the type of injury (e.g., the body parts injured). The example user interface informs the user that the user will be contacted by the remote system or an associated agent. A control is provided via which the user can initiate a call to the remote system or an associated agent.

Some or all user inputs provided via the user interfaces described herein may optionally be transmitted to the remote system, which may record some or all of the user inputs in an account record associated with the user.

Figure 5A:
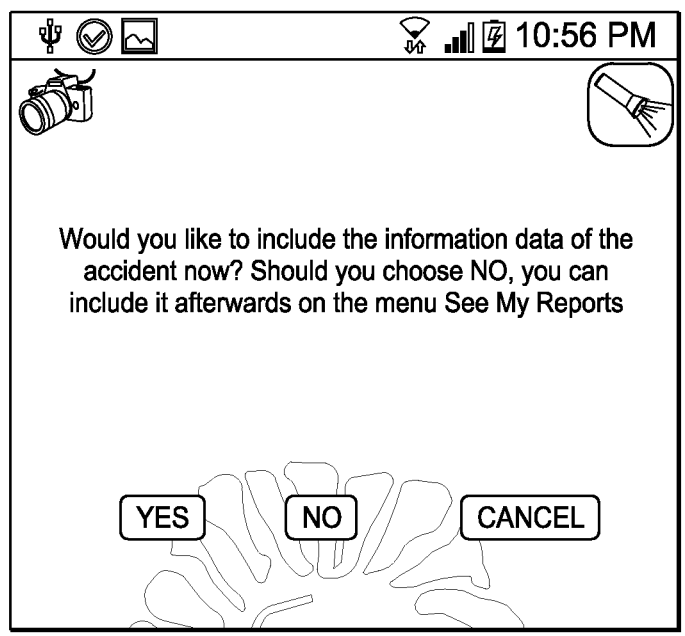
FIGS. 5A-5F illustrate example user interfaces.
Figure 5B:
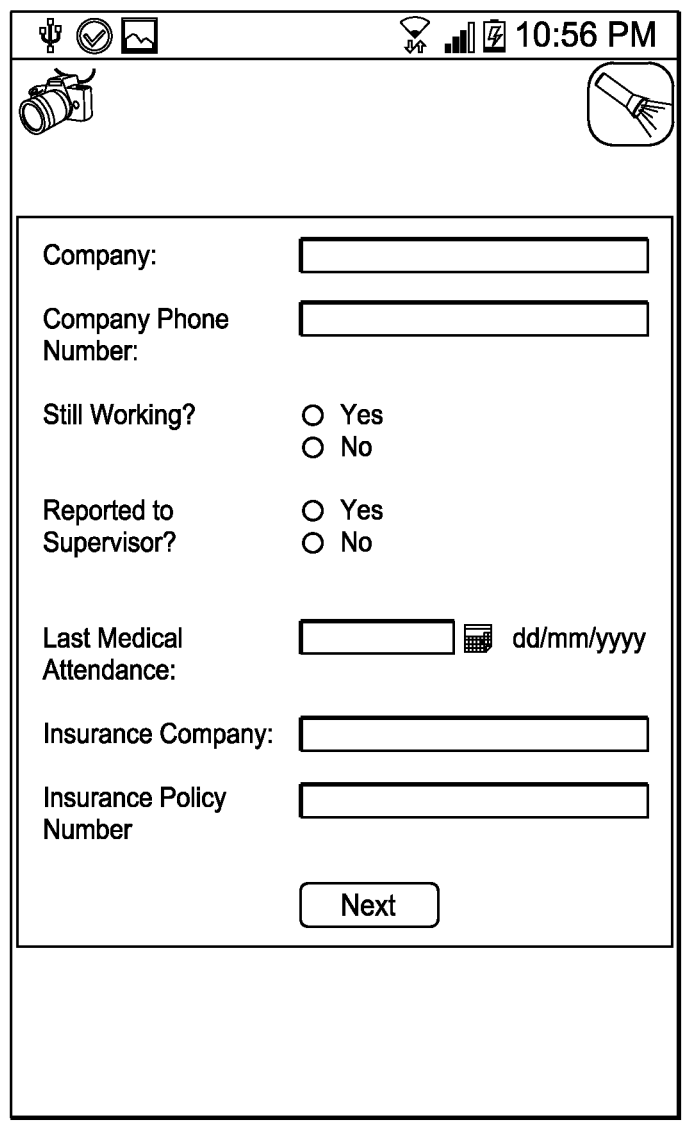
Figure 5C:
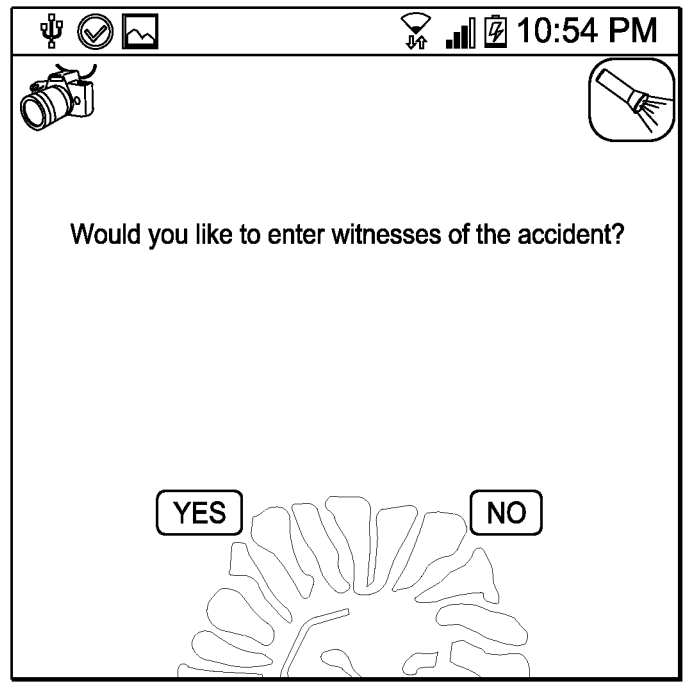

An example workplace accident report flow will now be described with reference to FIGS. 5A-5F. The example user interface illustrated in FIG. 5A asks the user to indicate (e.g., by activating a corresponding user control) whether the user wants to: provide a complete report regarding the workplace accident or injury via the app; have the system or an agent associated with the system contact the user (e.g., via a voice call) to collect the and enter the report information; or cancel the report altogether. If the user activates a control indicating that the user wants to provide the workplace accident/injury report via the app, the example user interface illustrated in FIG. 5B may be presented. Referring to FIG. 5B, fields are provided via which the user can enter information regarding the user's employer corresponding to the workplace where the accident occurred and other related information. For examples, fields may be provided configured to receive some or all of the following information: the employer's name, the employer's phone number, an indication as to whether the user is still working or not, and indication as to whether or not the user reported the accident to the user's supervisor, the date of the user's last medical appointment, the employer's and/or the user's insurance company name, the insurance company phone number, the insurance policy number, information regarding the user's injury (e.g., what part of the user was injured, how incapacitated the user is, etc.), etc. Once the user has indicated that the user has completed entering the information, the example user interface illustrated in FIG. 5C may be presented. The user is asked via the user interface whether there are any witnesses to the accident. If the user answers yes (e.g., by activating a "yes" control), the user interface illustrated in FIG. 5D may be presented. If the user answer's no, the witness related user interface may automatically be inhibited from being presented (skipped over) by the application.

Figure 5D:
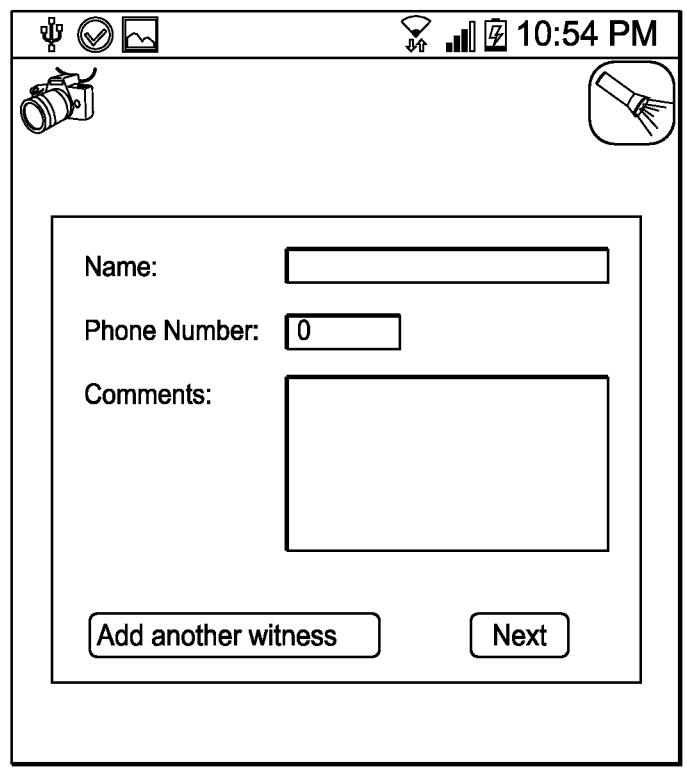
Figure 5E:
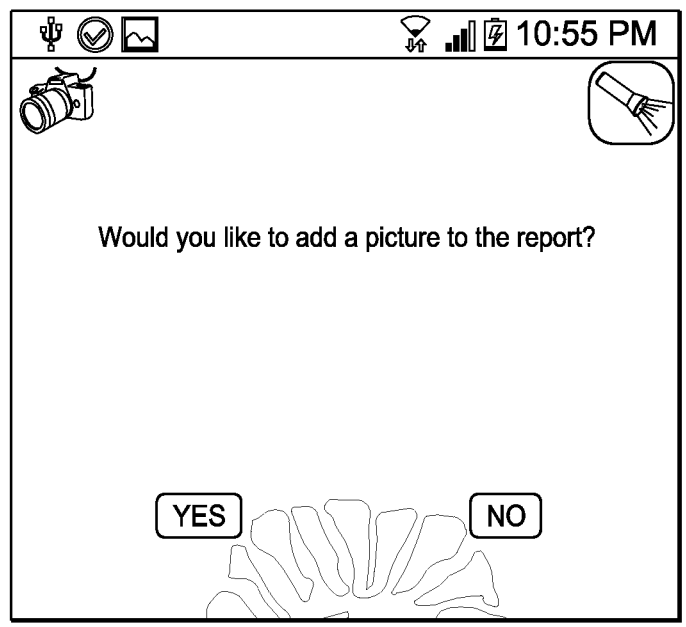
Figure 5F:
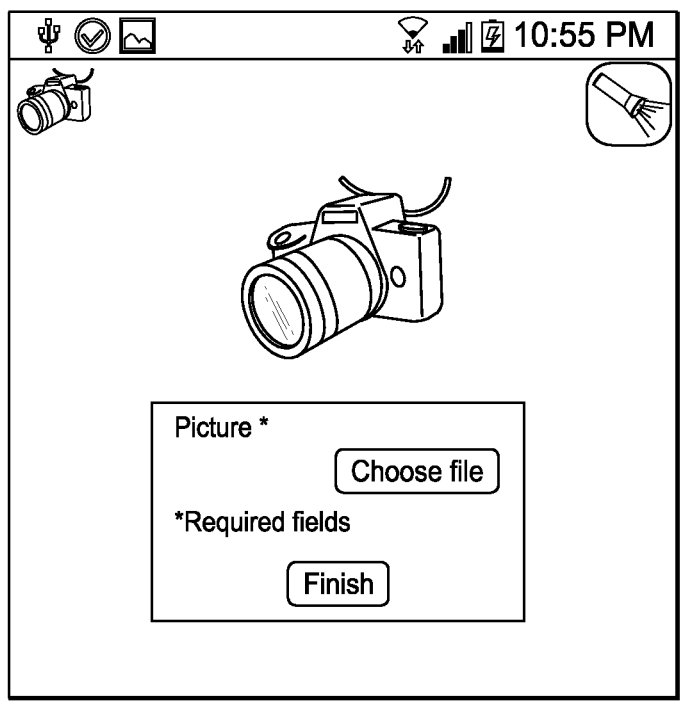

Referring to FIG. 5D, the example witness user interface may include fields for some or all of the following: name, phone number, email address, physical address, comments, etc. The user may request that the user interface be repeatedly provided for display to collect similar information regarding additional witnesses. The example user interface illustrated in FIG. 5E asks the user if the user wants to enter a photograph and/or video related to the accident (e.g., a photograph of the accident, and interview with a witness, etc.). The user can respond yes or no. If the user indicates that a photograph and/or video are to be taken, the example user interface illustrated in FIG. 5F may be presented. The user may take a photograph or video, or select a previously captured photograph or video. The user may then indicate that the photograph/video is to be included in the report. An example user interface may inform the user that the user will be contacted by the remote system or an associated agent. A control is optionally provided via which the user can initiate a call to the remote system or an associated agent.

Figure 6A:
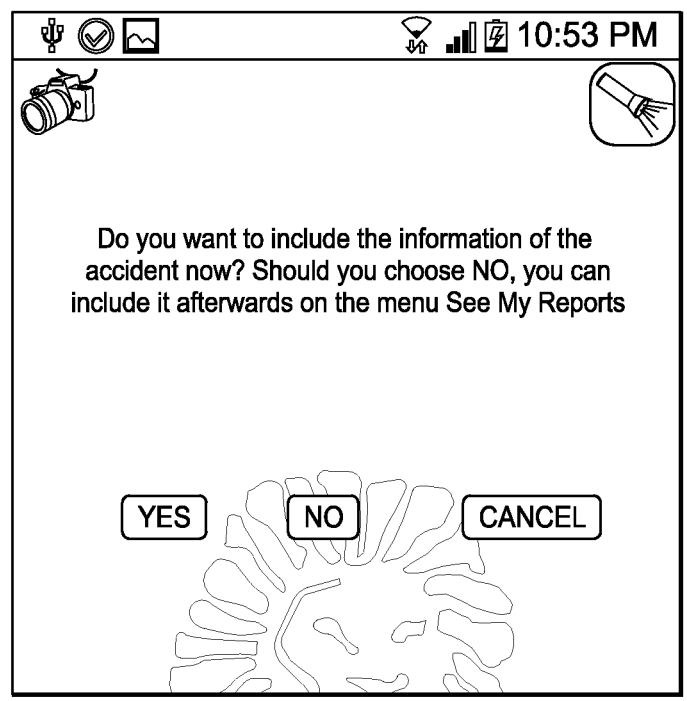
FIGS. 6A-6B illustrate example user interfaces.

An example personnel injury accident report flow will now be described with reference to FIGS. 6A-6B. The example user interface illustrated in FIG. 6A asks the user to indicate (e.g., by activating a corresponding user control) whether the user wants to: provide a complete report regarding the personal injury accident via the app; have the system or an agent associated with the system contact the user (e.g., via a voice call) to collect the and enter the report information; or cancel the report altogether. If the user activates a control indicating that the user wants to provide the personal injury accident report via the app, the example user interface illustrated in FIG. 6B may be presented.

Figure 6B:
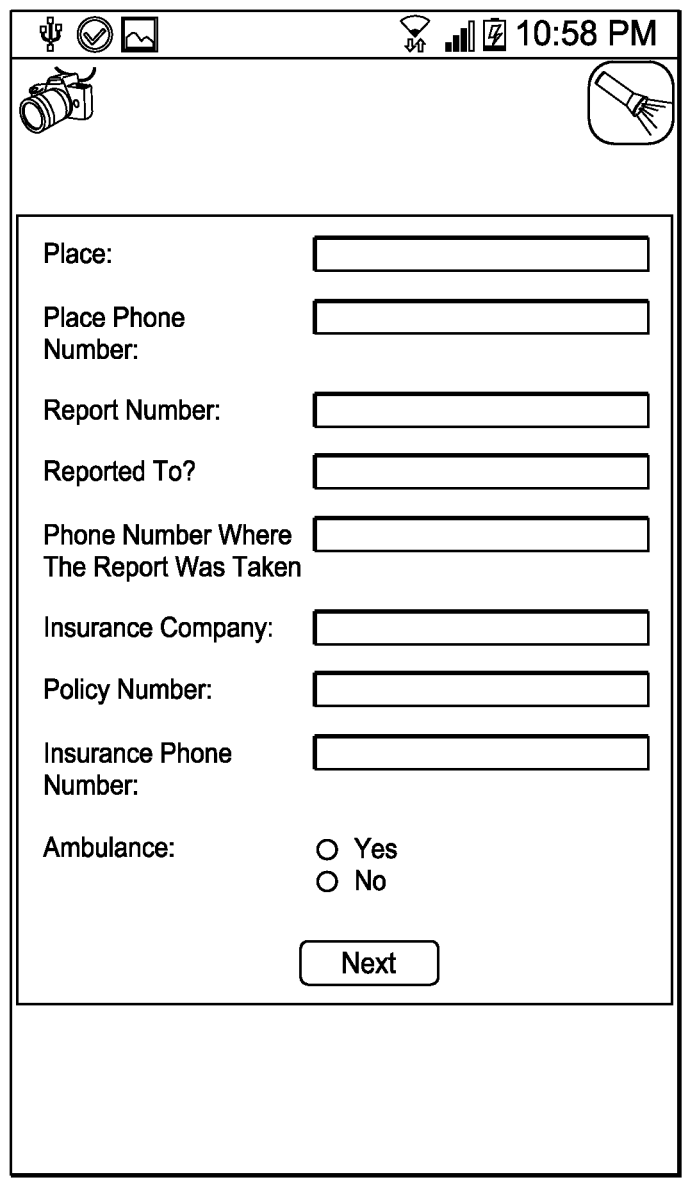

Referring to FIG. 6B, fields are provided via which the user can enter information regarding the location (e.g., retail establishment, apartment building, office building, etc.) where the accident occurred and other related information. For examples, fields may be provided configured to receive some or all of the following information: a location identifier (e.g., store name), the phone number, report number (if the user submitted a report to the location), an identification as to who the report was made to (e.g., name of an individual or department), phone number where the report was taken, the location insurance company, the insurance policy number, and indication as to whether an ambulance was used to take the user to a hospital, etc. A user interface may be provided asking the user whether there are any witnesses to the accident. If the user answers yes (e.g., by activating a "yes" control), a witness user interface may be provided including fields for some or all of the following: name, phone number, email address, physical address, comments, etc. The user may request that the user interface be repeatedly provided for display to collect similar information regarding additional witnesses. An example user interface may be provided which asks the user if the user wants to enter a photograph and/or video related to the accident (e.g., a photograph of the accident, and interview with a witness, etc.). The user can respond yes or no. If the user indicates that a photograph and/or video are to be taken, a user interface may be provided enabling the user to take a photograph or video, or select a previously captured photograph or video. The user may then indicate that the photograph/video is to be included in the report. An example user interface may inform the user that the user will be contacted by the remote system or an associated agent. A control is optionally provided via which the user can initiate a call to the remote system or an associated agent.

FIGS. 7A-7C will now be described with respect to providing access to reports, enabling a user to edit reports, providing lists of reports previously submitted by the user, and providing report status. Referring to FIG. 7A, the example user interface includes report access controls for the user's traffic accidents, the user's workplace accidents, and the user's personal accidents. The user may select one of the controls, and a corresponding list of reports submitted by the user may be presented, such as in the example user interface illustrated in FIG. 7B. The report list may include a report number, a remote date/time, and a status (e.g., whether the remote system has received the report, processed the report, acted on the report, etc.). If the app detects that the user clicked on a given listed report, the app may present the report, including the information previously submitted by the user, to the user. The user may then edit information in a given selected report, and save the changes (e.g., FIG. 7C).

Figure 8A:
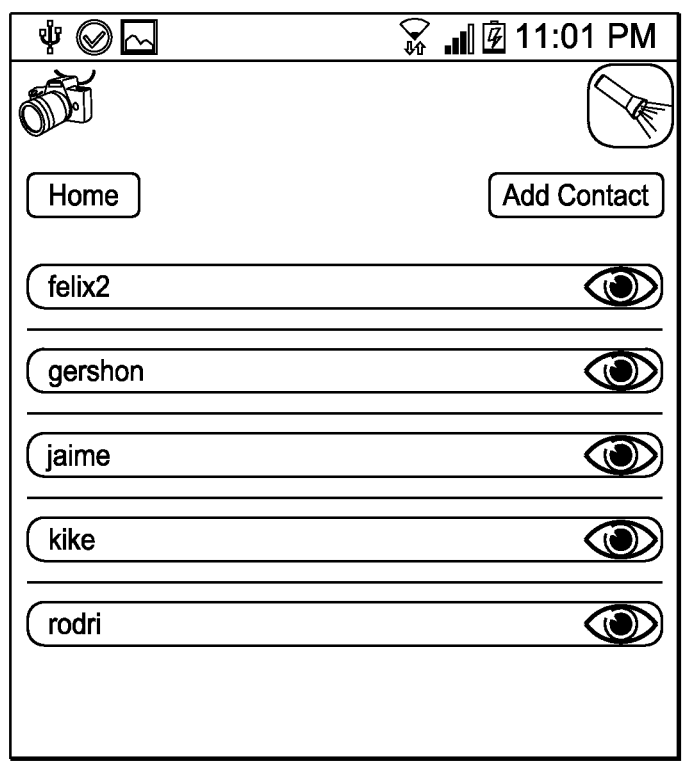
FIGS. 8A-8C illustrate example user interfaces.
Figure 8B:
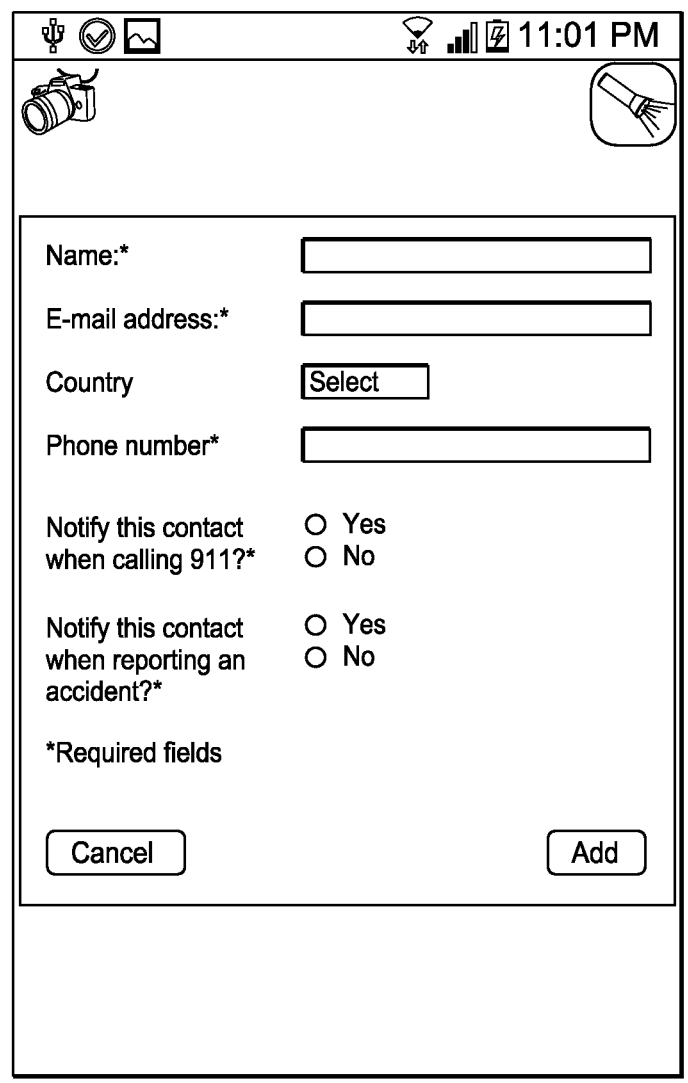
Figure 8C:
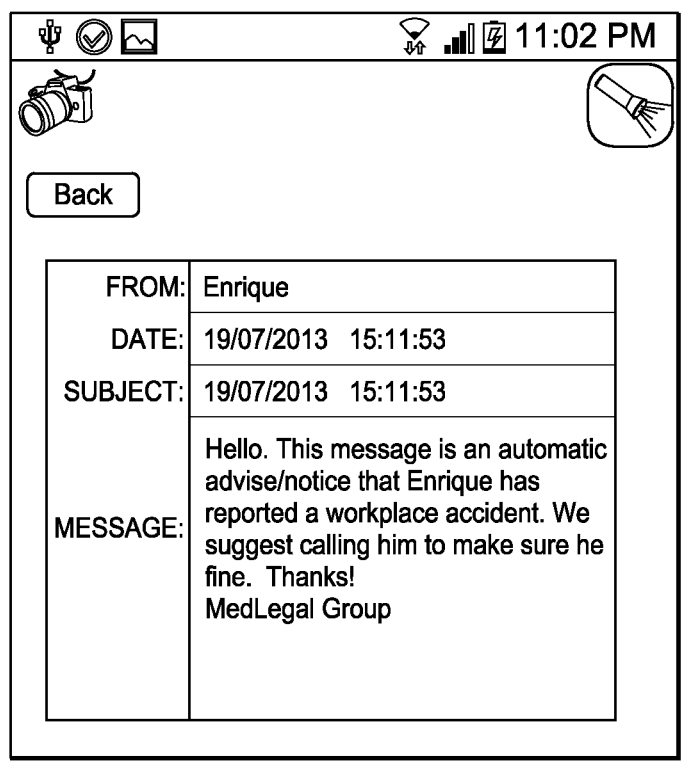

FIGS. 8A-C illustrate example user interfaces for indicating who notifications (e.g., text, email, and/or voice notification) should be sent to in the event an accident is reported and for providing user registration information. Fields are provided to enter/view the contact names. If the user activates an add contract control, the example contact entry user interface may be presented. Fields are provided via which the user may enter some or all of the following: the contact name, email address, country, phone number, mobile phone number/SMS address, an indication as to whether the contact should be automatically notified if the app/system detects that the user has initiated a call to an emergency phone number (e.g., a 911 number), an indication as to whether the contact should be automatically notified if the app/system detects that the user has reported an accident.

FIG. 8B illustrates an example message the user may enter to provide as a text notification in the event an accident report is initiated or submitted, or if the user initiates an emergency call.

FIG. 8C illustrates an example notification that may be transmitted to an emergency contact previously specified by the user in the event an accident occurs. The message may be transmitted as an SMS message, an MMS message, an email, and/or may be presented via an application installed on a device (e.g., a mobile communication device) of the contact. The system may customize or select the notification based at least in part on a determination as to what type of accident was reported (e.g., vehicular accident, personal accident, workplace accident), so that the message text reflects the accident type. The notification may include the user name as the sender, the user name in the subject line, the date and time of the notification (and/or the date and time the accident was reported), and the message text indicating the type of accident that occurred and suggesting that the message recipient contact the user.

FIG. 9 illustrates an example user profile user interface, which a user may complete as part of a registration process and update as needed or desired. Fields may be provide to receive some or all of the following: the user's name, phone number, email address, driver's license number, insured vehicle model, make, year, license plate number VIN, the vehicle insurance company name and phone number, the user's medical insurance company name and phone number, the medical insurance policy number, etc.

Some or all of the data and requests collected from (and about) users and/or service providers (e.g., transportation services providers, tow service providers, mechanics, lawyers, etc.) may be collected by the remote system (e.g., via a phone app) and provided for display to an administrator. Optionally, the administrator may elect the time period for which the data is to be displayed (e.g., service requests or accident reports received on the current day, the current week, the current month, or without time restrictions). Examples of such user interfaces will now be described.

Figure 10A:
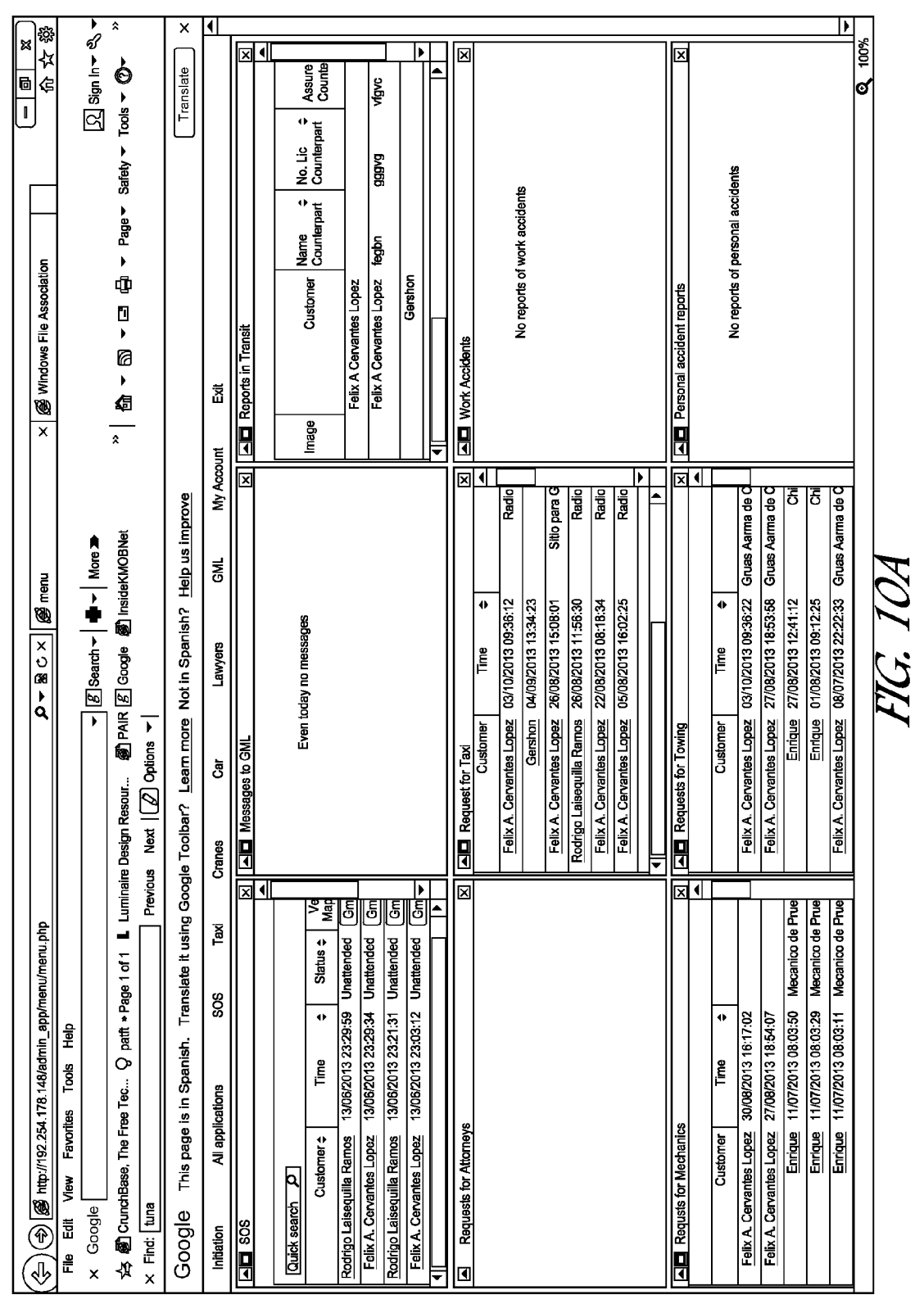

FIG. 10A illustrates an example administrative home page generated by the system and providing respective listings in sub-windows for emergency calls (SOS), requests for lawyers, requests for mechanics, messages for the system operator, requests for taxis, requests for tow services, reports of vehicular accidents, reports of work accidents, and reports of personal accidents. Optionally, the user can select one of the sub-windows to expand the selected sub-window and to view additional data (examples of which are described below). Optionally, the user can also select a given report via a menu.

Figure 10B:
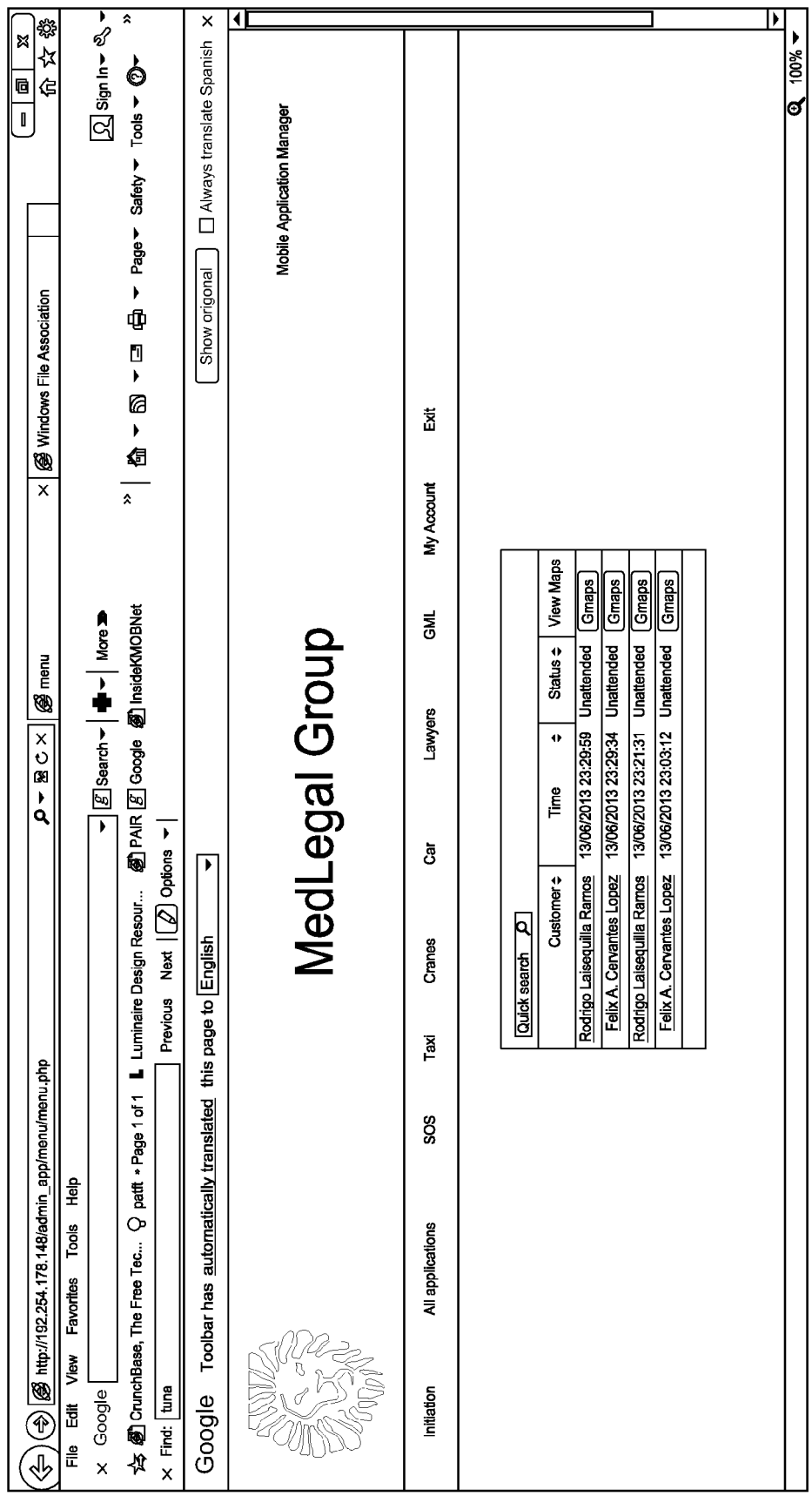

FIG. 10B illustrates an example user interface displaying records of emergency calls placed by users. In this example, the records are for emergency calls that occurred on the current day, although the system or user may specify other time frames, as similarly discussed above. In this example, the emergency call record listing includes the name of the user, the date/time of the emergency call, the status of the call (e.g., not yet serviced, serviced, etc.), and a link to a map showing the user's current location (e.g., based on location information received from the user's mobile device, such as GPS, cell tower, and/or Wi-Fi location information).

Figure 10C:
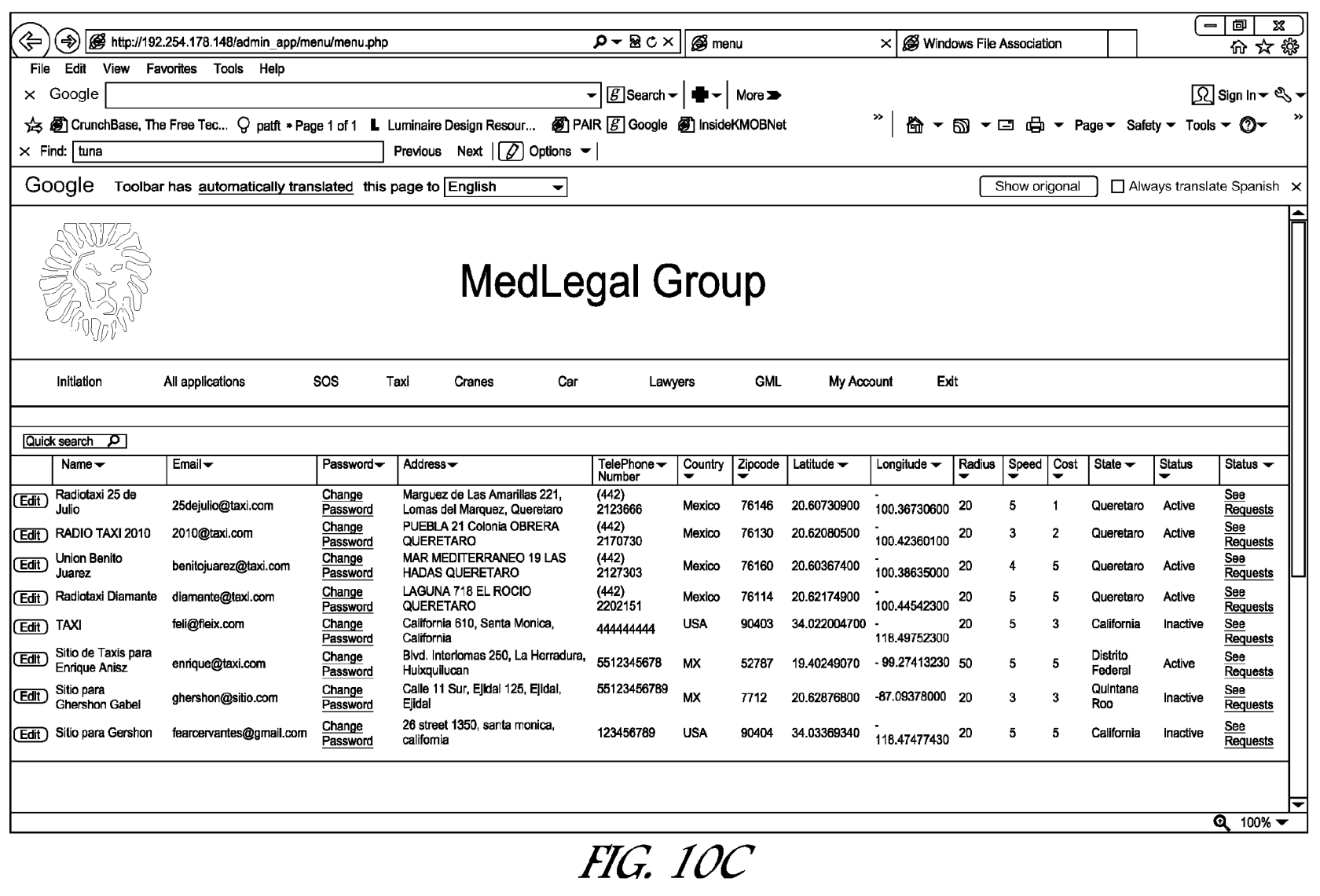

FIG. 10C illustrates an example user interface displaying records of transportation (e.g., taxi) service providers. In this example, a given record listing may include the name of the transportation service provider, the associated email address, a control to change the account password (optionally only certain authorized administrators may have access to changing the password), address, telephone number, country, postal code, latitude, longitude, radius from the transportation service provider location that the transportation service provider services (e.g., transportation service provider provides transportation services within a 5 mile radius of the transportation service provider's location), promptness rating, cost rating, state, status (e.g., active, inactive), and a link to review past requests for transportation services and/or to submit a new request for transportation services.

Figure 10D:
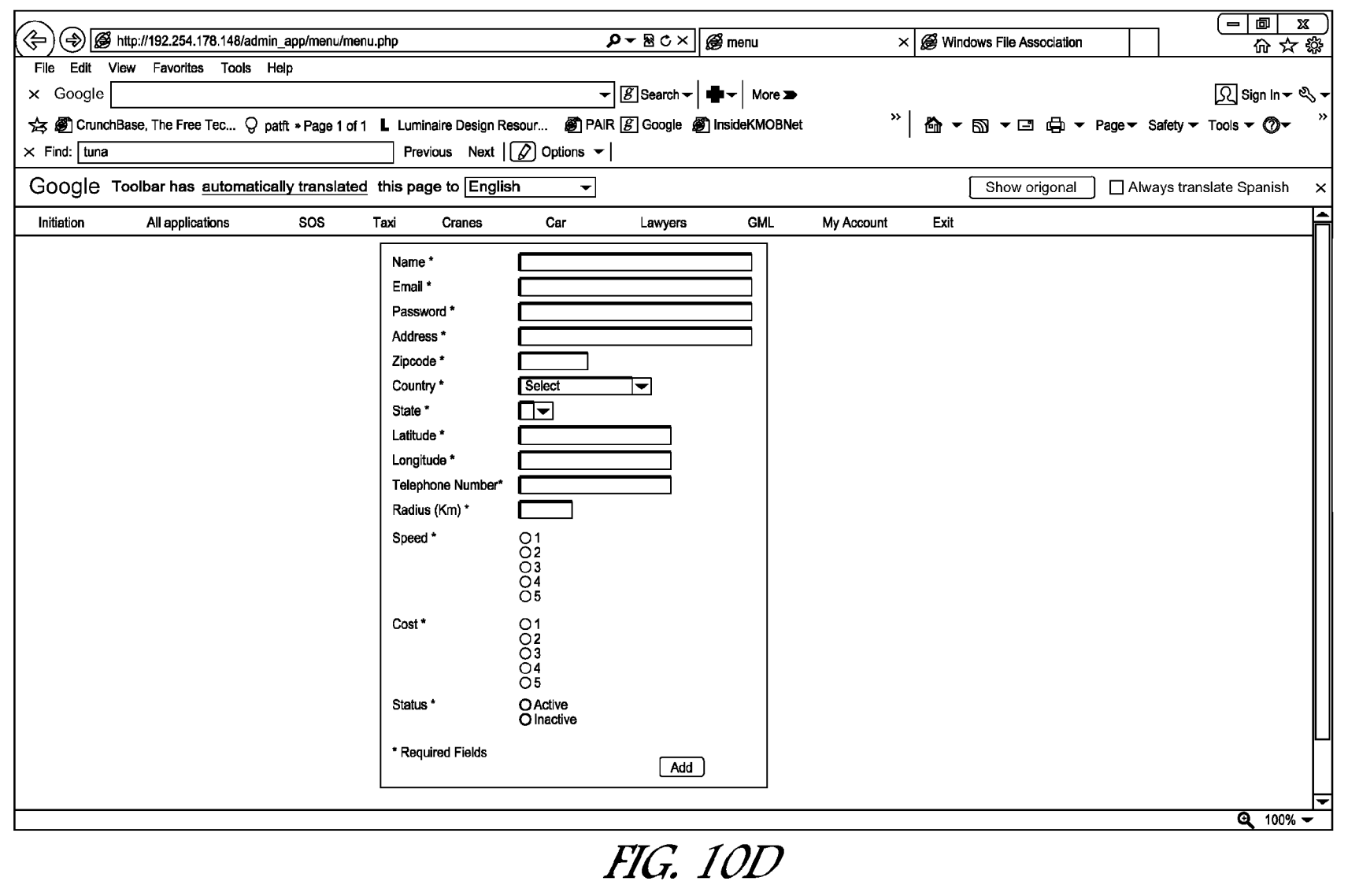

FIG. 10D illustrates an example transportation service registration user interface, including fields configured to receive some or all of the following information from the service provider: name, email, password, address, postal code, country, state, latitude, longitude, telephone number, radius served, a promptness/speed indication, a cost indication/rating (e.g., on a scale of 1-5 or other scale), and a status indication (e.g., active, inactive).

Figure 10E:
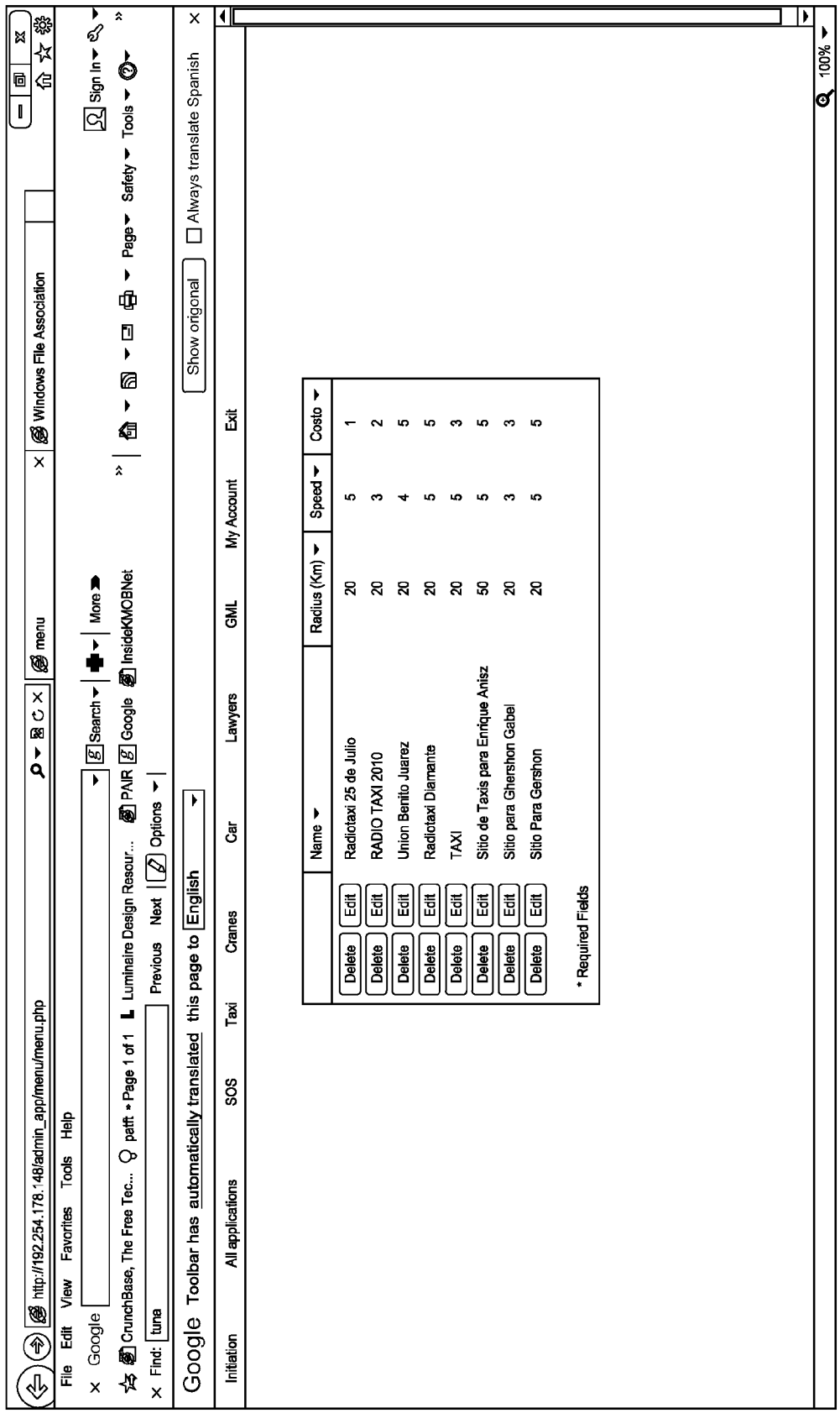

FIG. 10E illustrates an example transportation service summary user interface that presents summary information on transportation service providers, including name, radius served, speed, and cost information. In addition, for going data may be edited or deleted by a user.

Figure 10F:
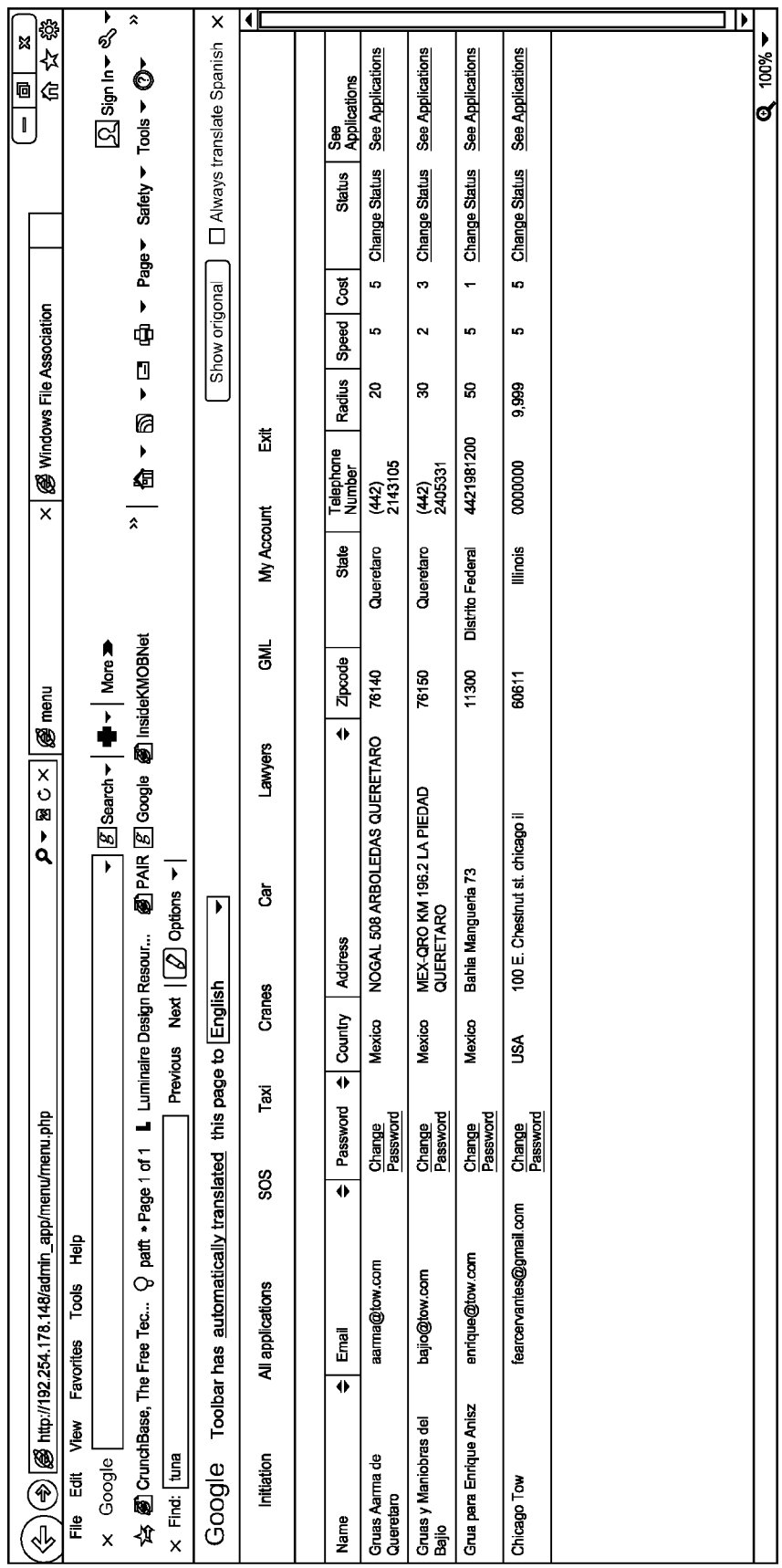

FIG. 10F illustrates an example user interface displaying records of towing service providers. In this example, a given record listing may include the name of the towing service provider, the associated email address, a control to change the account password (optionally only certain authorized administrators may have access to changing the password), physical address (and optionally latitude, longitude information), telephone number, country, postal code, service radius, promptness rating, cost rating, state (where located), a status field via which status may be assigned and/or reported (e.g., active, inactive), and a link to review past requests for towing services and/or to submit a new request for towing services. A towing service registration user interface may be provided to receive service provider information, optionally with the same or similar fields as described above with respect to the example transportation service registration user interface. A towing service provider summary user interface presents summary information such as name, radius served, speed, and cost information may be provided, as similarly discussed above with respect to the transportation service summary user interface.

Figure 10G:
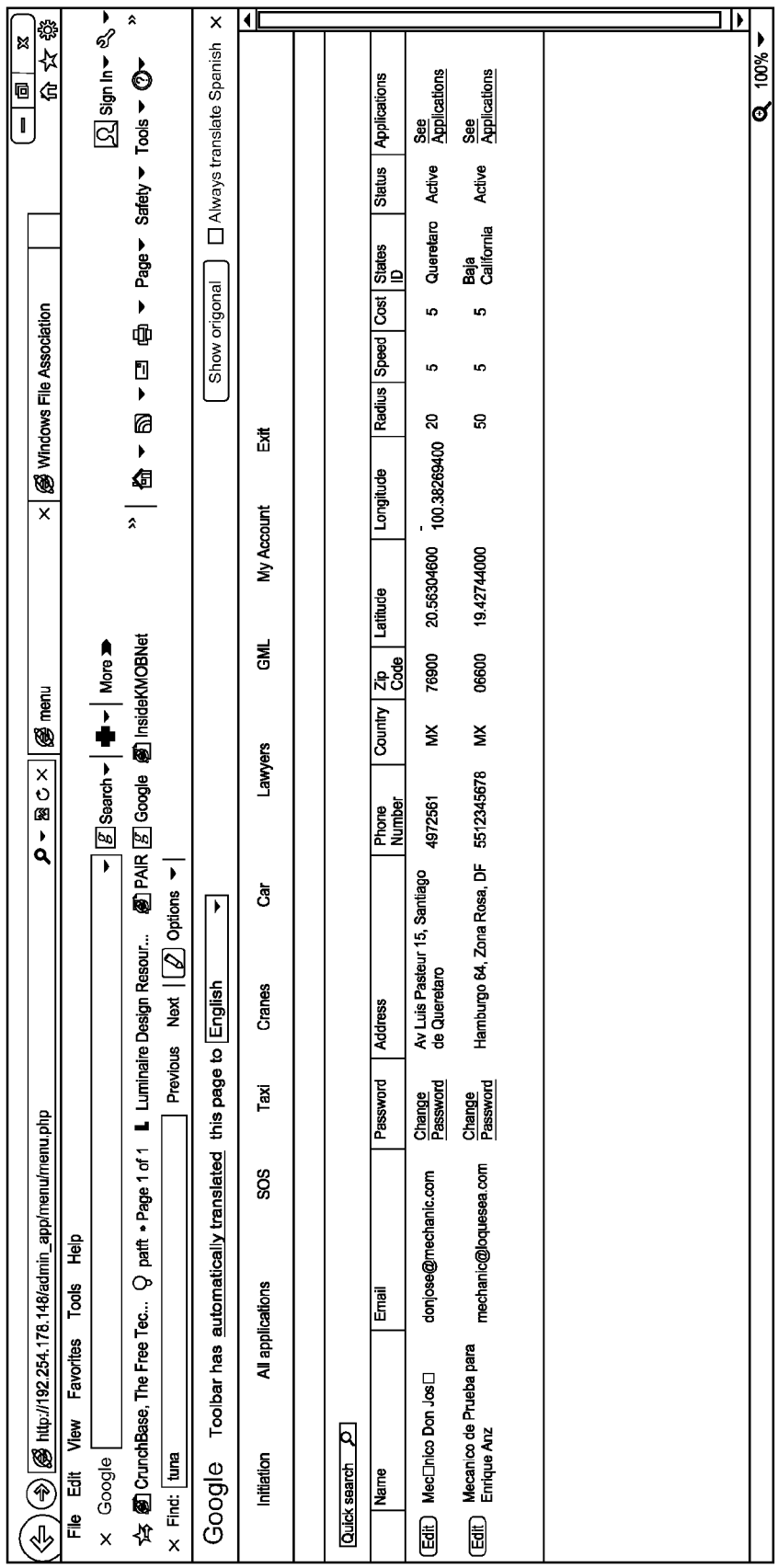

FIG. 10G illustrates an example user interface displaying records of mechanics/body shop service providers. In this example, a given record listing may include the name of the mechanics/body shop, the associated email address, a control to change the account password (optionally only certain authorized administrators may have access to changing the password), address (and optionally latitude, longitude information), telephone number, country, postal code, service radius, promptness rating, cost rating, state, status (e.g., active, inactive), and a link to review past requests for mechanics/body shop services and/or to submit a new request for mechanics/body shop services. A mechanics registration user interface may be provided, optionally with the same or similar fields as described above with respect to the example transportation service registration user interface. A mechanics/body shop service provider summary user interface presenting summary information such as name, radius served, speed, and cost information may be provided, as similarly discussed above with respect to the transportation service summary user interface.

Figure 10H:
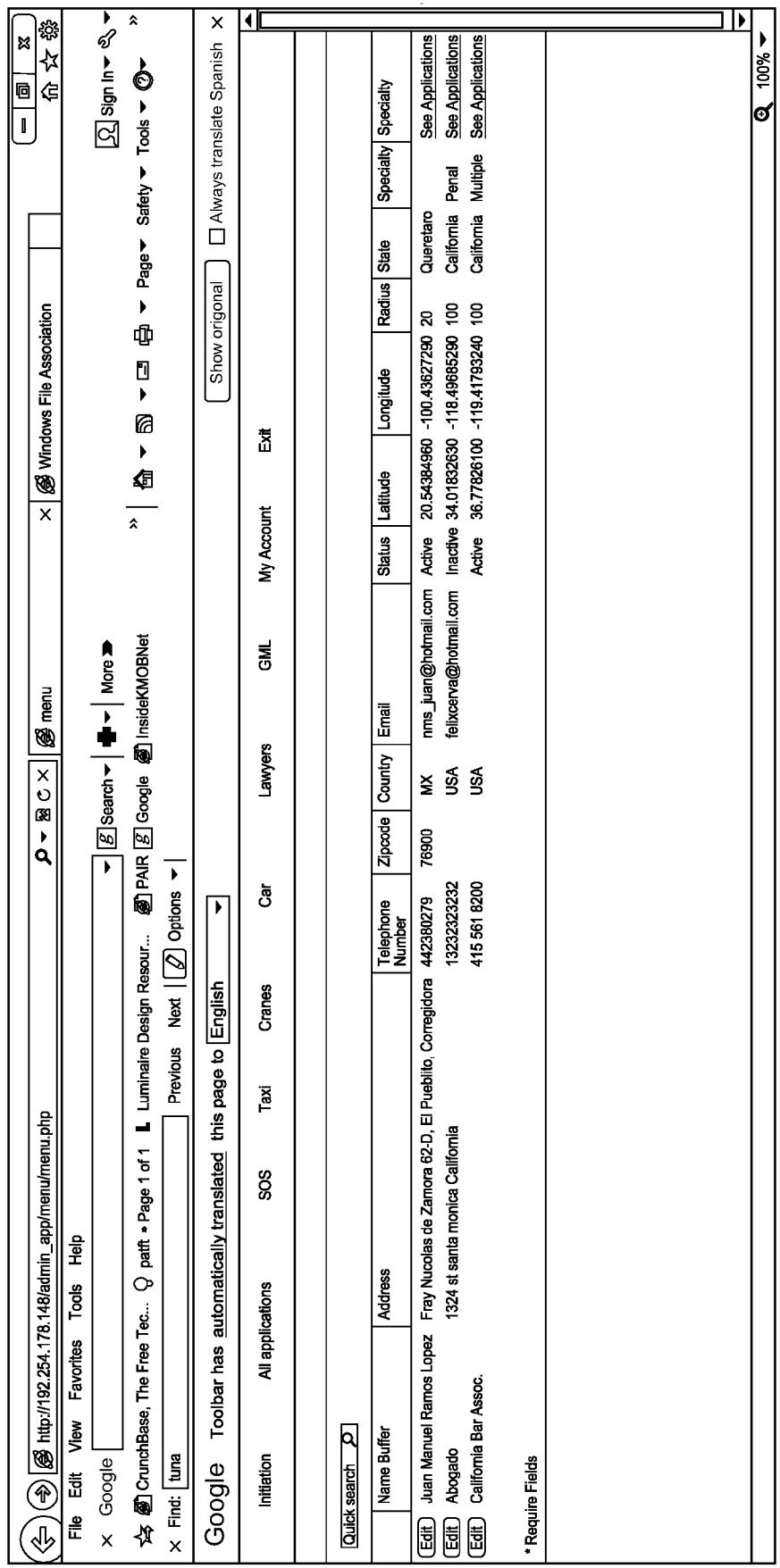

FIG. 10H illustrates an example user interface displaying records of legal service providers (e.g., lawyers). In this example, a given record listing may include the name of the legal service provider, the associated email address, a control to change the account password (optionally only certain authorized administrators may have access to changing the password), physical address, telephone number, country, postal code, latitude, longitude, service radius, promptness rating, cost rating, state, status (e.g., active, inactive), legal specialty (e.g., workman's compensation, vehicular accidents, personal accidents, etc.), and a link to review past requests for legal services and/or to submit a new request for legal services. A legal service provider registration user interface may be provided, optionally with the same or similar fields as described above with respect to the example transportation service registration user interface, as well as a legal specialty field. A legal service provider summary user interface presents summary information such as name, radius served, speed, and cost information may be provided, as similarly discussed above with respect to the transportation service summary user interface.

Figure 10I:
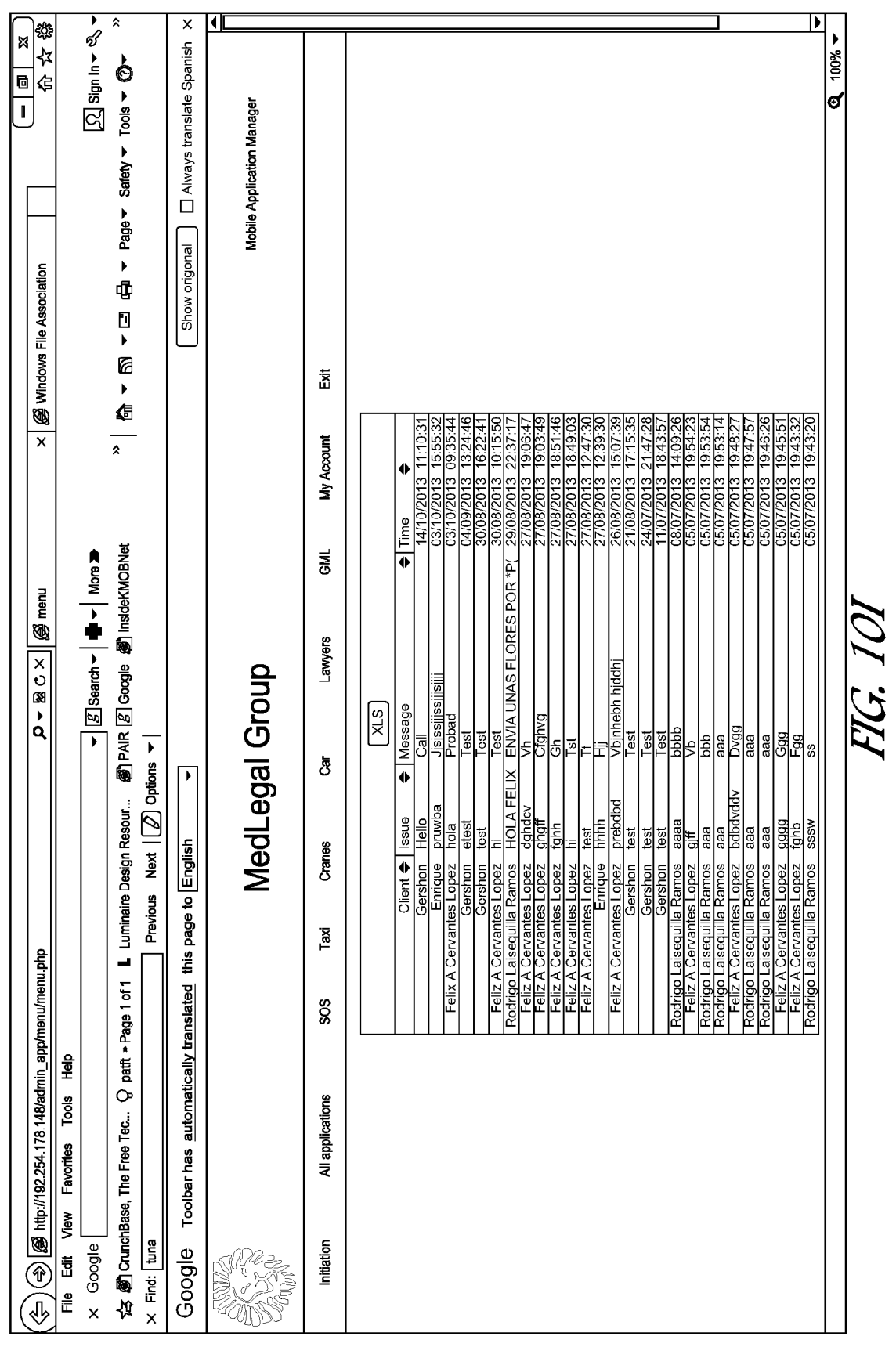

FIG. 10I illustrates an example user interface providing a log of communications between users and the system operator. A given log entry may include the name of the user, matter/subject information, the message (or a portion thereof), and a timestamp (data/time). Clicking on a given log entry will display the complete message text.

FIG. 10J illustrates an example user interface providing a listing of traffic accident reports of users. In this example, a given listing may include details regarding the other party involved in the traffic accident, such as the party's name, phone number, driver's license number, insurance carrier name, insurance policy number, the insurance provider phone number, as well as an indication as to whether a police report was made regarding the accident, the first name on the police report (if any), an indication as to whether there are witnesses to the accident, a timestamp as to when the report was made, status (e.g., waiting for reply, received reply, etc.), a link to a map indicating where the accident occurred and/or the current location of the user, and one or more accident-related photos uploaded by the user.

FIG. 10K illustrates an example user interface providing a listing of user workplace accident reports. In this example, a given listing may include a photograph, the user name, employer name, employer insurance company name, telephone number of insurance company, an indication as to whether the user reported the workplace accident or accident to a supervisor, supervisor name, date the accident was reported to the supervisor/employer, the date the user last sought medical attention, an indication as to whether the user is still working, last date the user worked, an indication as to whether there are witnesses to the accident or injury (and optionally a link to contact information for the witnesses), a timestamp as to when the report was made, status (e.g., waiting for reply, received reply, etc.), and a link to a map indicating where the accident or injury occurred and/or the current location of the user.

FIG. 10L illustrates an example user interface providing a listing of personal accident reports. In this example, a given listing may include the user name, the location of the accident, an accident report number (e.g., for a report submitted to the proprietor of the location of the accident), insurance company name, insurance policy number, telephone number of insurance company, an indication as to whether there are witnesses to the accident (and optionally a link to contact information for the witnesses), a timestamp as to when the report was made, status (e.g., waiting for reply, received reply, etc.), and a link to a map indicating where the accident occurred and/or the current location of the user.

While certain embodiments have been described as being configured to process and manage accident reports and accident related services, such embodiments may also be configured to process and manage other types of information and services. For example, certain embodiments may be configured to assist users with respect to legal documents and government correspondence (e.g., a letter, correspondence in the form of an email or PDF document, etc.). By way of illustration, a user may receive a government letter or other correspondence regarding the user's immigration status. The letter may be in English, while the user may not understand English and so may need assistance in translating and responding to the letter. Certain embodiments enable the user to upload a photograph or PDF of the correspondence or otherwise forward the correspondence to the system via a phone app, email, or other messaging service.

For example, the user may be provided with a document upload control via the phone app which the user can activate to initiate the process of photographing a hardcopy letter and uploading the photograph of the hardcopy letter to the remote system (e.g., the system illustrated in FIG. 1). The system may then instruct the user (e.g., via the phone app, an SMS message or otherwise) to call a phone number, such as a toll free number provided by the system orally or via a text message, and request a password/code for accessing/receiving an attorney referral. The user may then call the phone number, which may be answered, such as by an interactive voice response (IVR) system (e.g., hosted by the system). The IVR system provides the user with a password/code and prompts the user to enter the password via the app in order to receive a referral (e.g., to an attorney). It is understood that the password/code may be requested and received via other techniques, such as via the phone app, an email, an SMS message or otherwise. The user may then enter the password/code into a corresponding field presented by the app.

If the correct password is received from the user (e.g., via the app), the system accesses a database of attorney records and attorney referral criteria. For example, the attorney referral criteria may include some or all of the following: practice specialty, location relative to a user's current location and/or home location (e.g., accessed from the user's account information), performance ratings provided by the system operator, performance ratings provided by other users, ratings/feedback provided by a state bar, ratings/feedback provided by an independent rating agency, whether the attorney has retained advertising rights for the user's current location and/or home location, an indication as to the type of correspondence the user is reporting (e.g., an immigration letter), other information provided by the user, and/or other criteria. The system may use the information from the attorney records, optionally from the user device (e.g., location information), and optionally from the user's profile information, to select one or more attorneys to refer the user to. Information (e.g., contact information, rating information, and/or other information accessed from the database) regarding one or more of the selected attorneys may be transmitted to the user for presentation by the app on the user's device. Optionally, the user may select a given listed attorney, and the system may facilitate communication between the user and the attorney. For example, the system may transmit some or all of the information provided by the user (e.g., the correspondence) to the selected attorney, and may provide the user's contact information (e.g., mobile device phone number) so that the attorney can contact the user. Optionally, the system may also enable the user to call the selected attorney by activating a call link presented by the app in conjunction with the attorney referral. Optionally, the system will use a translation application to translate the correspondence into the user's native/spoken language (e.g., as indicated by the user's profile or otherwise indicated by the user) and provide a copy of the translated correspondence to the user and/or the attorney.

Certain embodiments discussed above receive photographs (e.g., accident photographs), captured using a mobile device camera of a user and transmitted to a remote system, such as the system discussed with respect to FIG. 1. In addition or instead, the system may access and receive such photographs from other sources.

For example, upon determining that a user has been involved in an accident (e.g., based on a user report submitted via the user's mobile device (using the application discussed above) and/or upon detecting the user has placed an emergency phone call), the system may dispatch an image capturing device to the location of the user (e.g., as determined via GPS, cell tower, and/or Wi-Fi location information from the user mobile device, via location information manually submitted by the user, or otherwise). Upon reaching the accident location, the image capturing device may then capture images (still images and/or videos) of the accident scene (automatically upon detecting the accident scene or in response to a user instruction or prompt). The images may then be transmitted to and received by the remote system for handling, as similarly described above with respect to a user-captured photograph/video.

Optionally, the application hosted on the user's mobile device may, in response to a user activation of a beacon control, or in response to a command from the remote system, activate the mobile device's flash or other light emission device in a pattern (e.g., a unique on/off pattern) to thereby act as a beacon, which the image capturing device may detect and use to better identify the location of the accident for navigation and/or image capture purposes.

The image capturing device may be in the form of a camera equipped aerial vehicle (e.g., an unmanned drone, a manned helicopter, etc.), or a camera equipped land vehicle (e.g., an unmanned land vehicle, a manned car or motorcycle, etc.). If the camera equipped vehicle is an unmanned vehicle, the remote system may, directly or via another system, load the accident location information, route information, and other information to the unmanned vehicle, which may use such information to navigate to the accident location. The unmanned vehicle may also be equipped with a GPS-based navigation system. Similar information may be loaded into a navigation system of a manually operated camera equipped vehicle.

Optionally, upon receipt of the accident indication, the system will determine if there are any restrictions (e.g., governmental or safety restrictions) with respect to sending a camera equipped vehicle to the accident location. If the system determines that there are restrictions (e.g., based on a data store of such restrictions tied to geographical locations), the system may elect not to dispatch a prohibited camera equipped vehicle to the accident location. However, if certain types of camera equipped vehicles are permitted and certain camera equipped vehicles are prohibited, the system may optionally dispatch a permitted camera equipped vehicle. For example, if an accident occurred near or in an airport or a defense facility, there may be a prohibition against drones, and the like.

Thus, systems and methods are disclosed for collecting, processing, and distributing information such as accident information.

Certain embodiments may be implemented via hardware, software stored on media, or a combination of hardware and software. For example, certain embodiments may include software/program instructions/modules stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors and comprising hardware, wired and/or wireless network interfaces (e.g., cellular, Wi-Fi, Bluetooth, T1, DSL, cable, optical, or other interface(s) which may be coupled to the Internet), content databases, customer account databases, etc.). Data stores (e.g., comprising databases) may be used to store some or all of the information discussed herein in memory.

By way of example, a given computing device may optionally include user interface devices, such as some or all of the following: one or more displays, keyboards, touch screens, speakers, microphones, mice, track balls, touch pads, tilt sensors, accelerometers, biometric sensors (e.g., fingerprint or face recognition sensors for authenticating a user) printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box coupled to a display, etc. Certain embodiments may be able to conduct hundreds (or more) of transactions and processes described herein within a second.

While certain embodiments may be illustrated or discussed as having certain example components, additional, fewer, or different components may be used. Processes described as being performed by a given system may be performed by a user terminal or other system or systems. Processes described as being performed by a user terminal may be performed by another system. Data described as being accessed from a given source may be stored by and accessed from other sources. Transmissions described herein may be via a wired and/or wireless network or other communications link. Further, with respect to the processes discussed herein, various states may be performed in a different order, not all states are required to be reached, and fewer, additional, or different states may be utilized.

User interfaces described herein are optionally presented (and user instructions may be received) via a user computing device using a browser, other network resource viewer, or otherwise. For example, the user interfaces may be presented (and user optionally instructions received) via an application (sometimes referred to as an "app"), such as a dedicated app configured specifically for accident reporting and/or communications activities, installed on the user's mobile phone, laptop, pad, desktop, television, set top box, phone, or other terminal. For example, an app may be downloaded to a user mobile device, such as a smart phone. Various features described or illustrated as being present in different embodiments or user interfaces may be combined into the same embodiment or user interface or separated into additional user interfaces. The example user interfaces illustrated herein need not be used. The user voice communications discussed herein may optionally be processed in whole or in part by a voice recognition system in the content of an interactive voice response system. The user voice communication may optionally be responded to by the interactive voice response system or a human agent.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

What is claimed is:

1. A method of managing accident-related communications, comprising:
providing an application, comprising software, configured to be downloaded to a mobile device of a user, wherein the application is configured to:
enable the user to report, to an accident information processing system, vehicular accidents, via a first set of user interfaces, the first set of user interfaces configured to receive vehicular accident related information comprising:
a name of a driver of a vehicle involved in the vehicular accident;
a driver's license number of the driver;
contact information of the driver;

insurance information of the driver;
an indication as to whether there were passengers in at least one vehicle involved in the vehicular accident, wherein the first set of user interfaces comprises a passenger involved control configured to indicate, when activated by the user, that a passenger was in at least one vehicle involved in the vehicular accident;
an indication as to whether the vehicular accident was reported to police, wherein the first set of user interfaces comprises a control via which the user can indicate whether a police report exists;
an indication as to whether the vehicular accident resulted in a physical injury, wherein the first set of user interfaces comprises a control via which the user can indicate whether the vehicular accident resulted in an injury;
an indication as to whether there was at least one witness to the vehicular accident and whether there are associated electronically recorded voice and/or image testimonies, wherein the first set of user interfaces comprises a control via which the user can indicate whether there was at least one witness to the vehicular accident;
image information related to the vehicular accident;
enable the user to report workplace accidents, to the accident information processing system, via a second set of user interfaces different than the first set of user interface, the second set of user interfaces configured to receive workplace accident related information for an accident suffered by the user, the accident related information comprising:
an employer name;
contact information of the employer;
an indication as to whether the user is currently working for the employer;
an indication as to whether the user reported the workplace accident to the employer;
an indication as to when the user last obtained medical services;
workplace-related insurance information;
enable the user to request referrals to at least a taxi service, a tow service, and an attorney;
enable the user to specify one or more contacts to whom an accident notification is to be automatically provided if an accident occurs;
provide a control that enables the user to activate a camera flash on the user mobile device independently of capturing an image using a camera of the mobile device;
enable the user to capture an image using the mobile device camera;
provide a user interface configured to enable a user to transmit a document comprising text or an image, or both text and an image;
receiving at the accident information processing system a first accident report regarding a first accident via the downloaded application installed on the user mobile device;
at least partly in response to receiving the first accident report, automatically transmitting an accident notification to the user-specified one or more contacts to whom an accident notification is to be provided;
determining, by the accident information processing system, what type of accident the user is reporting based at least in part on information associated with the first accident report;
determining, by the accident information processing system, a location of the first accident based at least in part on the first accident report and/or determining a physical address associated with the user;
determining, by the accident information processing system, which attorney has a first set of rights with respect to the location of the first accident and/or the physical address associated with the user, and attorney information accessed from a data store, wherein the first set of rights comprises at least an advertising right corresponding to the location of the first accident and/or the physical address associated with the user;
selecting, by the accident information processing system, at least a first attorney based at least in part on the determination as to which attorney has the first set of rights wherein the first set of rights comprises at least an advertising right corresponding to the location of the first accident and/or the physical address associated with the user;
transmitting, by the accident information processing system, information regarding the first attorney to the application installed on the user mobile device for presentation to the user, the information regarding the selected first attorney including a rating provided by at least one other user;
in response to a user input, provided via the application, transmitting, by the accident information processing system, at least a portion of the first accident report to the selected attorney;
receiving, by the accident information processing system, a request from the user for a taxi service;
determining a current location of the user;
based at least in part on the user's current location, identifying, by the accident information processing system, one or more taxi services;
transmitting, by the accident information processing system, to the application installed on the user mobile device, a listing of a plurality of identified taxi services;
enabling the user to select a listed taxi service from the plurality of listed identified taxi services;
enabling the user to initiate a taxi request to a user selected taxi service;
receiving a first document submitted via the user interface configured to enable a user to transmit a document comprising text or an image, or both text and an image;
determining a subject matter of the first document;
based at least in part on the subject matter of the document and the physical address associated with the user, selecting at least one attorney;
transmitting information regarding the at least one attorney to the application installed on the user mobile device for presentation to the user; and
enabling the user to communicate with the at least one attorney;
wherein the accident information processing system comprises computing hardware, a network interface, and a data store, the data store comprising non-transitory memory and an accident database.

2. The method as defined in claim 1, wherein the application is configured to provide a user interface configured to receive information for a personal injury report, the user interface configured to receive information comprising:
an accident facility identifier corresponding to a facility is where the accident occurred;
a phone number associated with the facility;
an accident report number associated with a report made to a representative associated with the facility; and
an indication as to whether an ambulance responded to the accident at the facility.

3. The method as defined in claim 1, wherein the listing of the plurality of identified taxi services comprises a listing of the plurality of identified taxi services and respective rates charged by the plurality of identified taxi services.

4. The method as defined in claim 1, wherein the application further comprises an emergency call control, the method further comprising detecting a user activation of the emergency call control and at least partly in response automatically transmitting a notification to the user-specified one or more contacts to whom an accident notification is to be provided.

5. The method as defined in claim 1, wherein the application is configured to provide a user interface configured to enable a user to transmit a government document to a first destination, and the method further comprising:
determining a subject matter of the government document;
based at least in part on the subject matter of the government document and the physical address associated with the user, selecting at least one attorney;
transmitting information regarding the at least one attorney to the application installed on the user mobile device for presentation to the user; and
enabling the user to communicate with the at least one attorney.

6. A method of managing accident-related communications, comprising:
providing an application, comprising software, configured to be downloaded to a mobile device of a user, wherein the application is configured to:
enable the user to report, to an accident information processing system, vehicular accidents via a first set of user interfaces, the first set of user interfaces configured to receive vehicular accident related information comprising:
a name of a driver of a vehicle involved in the vehicular accident;
a driver's license number of the driver;
contact information of the driver;
insurance information of the driver;
an indication as to whether there were passengers in at least one vehicle involved in the vehicular accident, wherein the first set of user interfaces comprises a passenger involved control configured to indicate, when activated by the user, that a passenger was in at least one vehicle involved in the vehicular accident;
an indication as to whether the vehicular accident was reported to police, wherein the first set of user interfaces comprises a control via which the user can indicate whether a police report exists;
an indication as to whether there was at least one witness to the vehicular accident, wherein the first set of user interfaces comprises a control via which the user can indicate whether there was at least one witness to the vehicular accident;
image information related to the vehicular accident;
enable the user to report workplace accidents, to the accident information processing system, via a second set of user interfaces different than the first set of user interface, the second set of user interfaces configured to receive workplace accident related information for an accident involving the user, the accident related information comprising:
an employer name;
contact information of the employer;
enable the user to request referrals to at least a taxi service and an attorney;
enable the user to specify one or more contacts to whom an accident notification is to be automatically provided if an accident occurs;
enable the user to capture an image using the mobile device camera;
provide a user interface configured to enable a user to transmit a document comprising text or an image, or both text and an image, to a first destination;
receiving at the accident information processing system a first accident report regarding a first accident via the downloaded application on the user mobile device;
in response to receiving the first accident report and based at least in part on contacts specified by the user to whom an accident notification is to be provided, automatically transmitting an accident notification to the user specified one or more contacts to whom an accident notification is to be provided;
determining, by the accident information processing system, what type of accident the user is reporting based at least in part on the first accident report;
determining, by the accident information processing system, a location of the first accident based at least in part on the first accident report and/or determining a physical address associated with the user;
determining, by the accident information processing system, which attorney has a first set of rights with respect to the location of the first accident and/or the physical address associated with the user, and attorney information accessed from a data store, wherein the first set of rights comprises at least an advertising right corresponding to the location of the first accident and/or the physical address associated with the user;
selecting, by the accident information processing system, at least a first attorney based at least in part on the determination as to which attorney has the first set of rights, wherein the first set of rights comprises at least an advertising right corresponding to the location of the first accident and/or the physical address associated with the user;
transmitting, by the accident information processing system, information regarding the first attorney to the application installed on the user mobile device for presentation to the user, the information regarding the selected first attorney including a rating provided by at least one other user;
in response to a user input, provided via the application, transmitting, by the accident information processing system, at least a portion of the first accident report to the selected attorney;
receiving, by the accident information processing system, a request from the user for a taxi service and/or a tow service;
determining a current location of the user;
based at least in part on the user's current location, identifying, by the accident information processing system, a plurality of taxi services and/or a tow services having, respectively, a taxi or a tow truck within a first range of the user's current location;
transmitting, by the accident information processing system, to the application installed on the user mobile device a listing of the plurality of identified taxi services and/or tow services;
enabling the user to select a listed taxi service and/or tow service from the plurality of listed identified taxi services and/or tow services;

enabling the user to initiate a communication to a user selected taxi service and/or tow service;

wherein the accident information processing system comprises computing hardware, a network interface, and a data store, the data store comprising non-transitory memory and an accident database, receiving a first document submitted via the user interface configured to enable a user to transmit a document comprising text or an image, or both text and an image;

determining a subject matter of the first document;

based at least in part on the subject matter of the document and the physical address associated with the user, selecting at least one attorney;

transmitting information regarding the at least one attorney to the application installed on the user mobile device for presentation to the user; and enabling the user to communicate with the at least one attorney.

7. The method as defined in claim 6, wherein the application is configured to provide a user interface configured to receive information for a personal injury report, the user interface configured to receive information comprising:

an accident facility identifier corresponding to a facility is where the accident occurred;

contact information associated with the facility;

an accident report number associated with a report made to a representative associated with the facility; and an indication as to whether an ambulance responded to the accident at the facility.

8. The method as defined in claim 6, wherein the listing of the plurality of identified taxi services and/or tow services comprises a listing of the plurality of identified taxi services and respective rates charged by the one or more identified taxi services.

9. The method as defined in claim 6, wherein the application further comprises an emergency call control, the method further comprising detecting a user activation of the emergency call control and at least partly in response automatically transmitting a notification to the user specified one or more contacts to whom an accident notification is to be provided.

10. The method as defined in claim 6, wherein the application is configured to provide a user interface configured to enable a user to transmit a government document to a first destination, and the method further comprising:

determining a subject matter of the government document;

based at least in part on the subject matter of the document and the physical address associated with the user, selecting at least one attorney;

transmitting information regarding the at least one attorney to the application installed on the user mobile device for presentation to the user; and enabling the user to communicate with the at least one attorney.

11. An accident management system, comprising:

a computing system comprising hardware;

a non-transitory computer storage medium having stored thereon executable instructions that direct the computing system to perform operations comprising:

providing an application, comprising software, configured to be downloaded to a mobile device of a user, wherein the application is configured to:

enable the user to report accidents via a first set of user interfaces, the first set of user interfaces configured to receive vehicular accident related information comprising:

a name of a driver of a vehicle involved in the vehicular accident;

a driver's license number of the driver;

insurance information of the driver;

an indication as to whether there were passengers in at least one vehicle involved in the vehicular accident, wherein the first set of user interfaces comprises a passenger involved control configured to indicate, when activated by the user, that a passenger was in at least one vehicle involved in the vehicular accident;

an indication as to whether the vehicular accident was reported to police, wherein the first set of user interfaces comprises a control via which the user can indicate whether a police report exists;

an indication as to whether there was at least one witness to the vehicular accident, wherein the first set of user interfaces comprises a control via which the user can indicate whether there was at least one witness to the vehicular accident image information related to the vehicular accident;

enable the user to report workplace accidents, to the accident information processing system, via a second set of user interfaces different than the first set of user interface, the second set of user interfaces configured to receive workplace accident related information for an accident involving the user, the accident related information comprising:

an employer name;

contact information of the employer;

enable the user to request referrals to at least a taxi service and an attorney;

enable the user to specify one or more contacts to whom an accident notification is to be automatically provided if an accident occurs;

enable the user to capture an image using the mobile device camera;

provide a user interface configured to enable a user to transmit a document comprising text or an image, or both text and an image;

receiving a first accident report regarding a first accident via the downloaded application on the user mobile device;

in response to receiving the first accident report and based at least in part on contacts specified by the user to whom an accident notification is to be provided, automatically transmitting an accident notification to the user specified one or more contacts to whom an accident notification is to be provided;

determining what type of accident the user is reporting based at least in part on the first accident report;

determining a location of the first accident based at least in part on the first accident report and/or determining a physical address associated with the user;

determining which attorney has a first set of rights with respect to the location of the first accident and/or the physical address associated with the user, and attorney information accessed from a data store wherein the first set of rights comprises at least an advertising right corresponding to the location of the first accident and/or the physical address associated with the user;

selecting at least a first attorney based at least in part on the determination as to which attorney has the first set of rights wherein the first set of rights comprises at least an advertising right corresponding to the location of the first accident and/or the physical address associated with the user;

transmitting information regarding the first attorney to the application installed on the user mobile device for presentation to the user, the information regarding the selected first attorney including a rating provided by at least one other user;

in response to a user input, provided via the application, transmitting at least a portion of the first accident report to the selected attorney;

receiving a request from the user for a taxi service and/or a tow service;

determining a current location of the user;

based at least in part on the user's current location, identifying a plurality of taxi services and/or a tow services having, respectively, a taxi or a tow truck within a first range of the user's current location;

transmitting to the application installed on the user mobile device a listing of the plurality of identified taxi services and/or tow services;

enabling the user to select a listed taxi service and/or tow service from the plurality of listed identified taxi services and/or tow services;

enabling the user to initiate a communication to a user selected taxi service and/or tow service, receiving a first document submitted via the user interface configured to enable a user to transmit a document comprising text or an image, or both text and an image;

determining a subject matter of the first document;

based at least in part on the subject matter of the document and the physical address associated with the user, selecting at least one attorney;

transmitting information regarding the at least one attorney to the application installed on the user mobile device for presentation to the user; and enabling the user to communicate with the at least one attorney.

12. The system as defined in claim 11, wherein the application is configured to provide a user interface configured to receive information for a personal injury report, the user interface configured to receive information comprising:
an accident facility identifier corresponding to a facility is where the accident occurred;
contact information associated with the facility;
an accident report number associated with a report made to a representative associated with the facility; and
an indication as to whether an ambulance responded to the accident at the facility.

13. The system as defined in claim 11, wherein the listing of the plurality of identified taxi services and/or tow services comprises a listing of the plurality of identified taxi services and respective rates charged by the one or more identified taxi services.

14. The system as defined in claim 11, wherein the application further comprises an emergency call control, the operations further comprising detecting a user activation of the emergency call control and at least partly in response automatically transmitting a notification to the user specified one or more contacts to whom an accident notification is to be provided.

15. The system as defined in claim 11, wherein the application is configured to provide a user interface configured to enable a user to transmit a government document to a first destination, and
the operations further comprising:

determining a subject matter of the government document;

based at least in part on the subject matter of the document and the physical address associated with the user, selecting at least one attorney;

transmitting information regarding the at least one attorney to the application installed on the user mobile device for presentation to the user; and enabling the user to communicate with the at least one attorney.

16. An accident management system, comprising:
a computing system comprising hardware;
a non-transitory computer storage medium having stored thereon executable instructions that direct the computing system to perform operations comprising:
receiving a user-specification of one or more contacts to whom an accident notification is to be automatically provided if an accident occurs;
receiving a first accident report regarding a first accident via an application installed on mobile device of a user, wherein the application is configured to provide a user interface configured to enable a user to transmit a document comprising text or an image, or both text and an image;
in response to receiving the first accident report and based at least in part on the received user-specification of one or more contacts to whom an accident notification is to be automatically provided if an accident occurs, automatically transmitting an accident notification to the user specified one or more contacts to whom an accident notification is to be provided;
determining what type of accident the user is reporting based at least in part on the first accident report;
determining a location of the first accident based at least in part on the first accident report, or determining a physical address associated with the user, or determining both the location of the first accident based at least in part on the first accident report and the physical address associated with the user;
determining which attorney has a first set of rights with respect to the location of the first accident and/or the physical address associated with the user, and attorney information accessed from a data store wherein the first set of rights comprises at least an advertising right corresponding to the location of the first accident and/or the physical address associated with the user;
selecting at least a first attorney based at least in part on the determination as to which attorney has the first set of rights wherein the first set of rights comprises at least an advertising right corresponding to the location of the first accident and/or the physical address associated with the user;
transmitting information regarding the first attorney to the application installed on the user mobile device for presentation to the user, the information regarding the selected first attorney including a rating provided by at least one other user;
in response to a user input, provided via the application, transmitting at least a portion of the first accident report to the selected attorney;
receiving a request from the user for a taxi service or a tow service, or both a taxi service and a tow service from the user via the application installed on the user mobile device;
determining a current location of the user based at least in part on information provided via the mobile device of the user;

based at least in part on the user's current location, identifying one or more taxi services or tow services, or both one or more taxi services and tow services, having, respectively, servicing the user's current location;

transmitting to the application installed on the user mobile device a listing of one or more identified taxi services or tow services, or both taxi services and tow services from which the user may select;

enabling the user to select a listed taxi service or a listed tow service, or both a listed taxi service and tow service;

enabling the user to initiate a communication to a user selected taxi service or tow service, or both a user selected taxi service and tow service;

receiving a first document submitted via the user interface configured to enable a user to transmit a document comprising text or an image, or both text and an image;

determining a subject matter of the first document;

based at least in part on the subject matter of the document and the physical address associated with the user, selecting at least one attorney;

transmitting information regarding the at least one attorney to the application installed on the user mobile device for presentation to the user; and enabling the user to communicate with the at least one attorney.

17. The system as defined in claim 16, wherein the application is configured to provide a user interface configured to receive information for a personal injury report, the user interface configured to receive information comprising:

an accident facility identifier corresponding to a facility is where the accident occurred;

contact information associated with the facility;

an accident report number associated with a report made to a representative associated with the facility; and an indication as to whether an ambulance responded to the accident at the facility.

18. The system as defined in claim 16, wherein the listing of one or more identified taxi services and/or tow services comprises a listing of one or more identified taxi services and respective rates charged by the one or more identified taxi services.

19. The system as defined in claim 16, wherein the application further comprises an emergency call control, the operations further comprising detecting a user activation of the emergency call control and at least partly in response automatically transmitting a notification to the user specified one or more contacts to whom an accident notification is to be provided.

20. The system as defined in claim 16, wherein the application is configured to provide a user interface configured to enable a user to transmit a government document to a first destination, and the operations further comprising;

determining a subject matter of the government document;

based at least in part on the subject matter of the document and the physical address associated with the user, selecting at least one attorney;

transmitting information regarding the at least one attorney to the application installed on the user mobile device for presentation to the user; and enabling the user to communicate with the at least one attorney.

* * * * *

UNITED STATES PATENT AND TRADEMARK OFFICE
CERTIFICATE OF CORRECTION

PATENT NO. : 9,877,176 B2
APPLICATION NO. : 14/133330
DATED : January 23, 2018
INVENTOR(S) : Gershon Gabel It is certified that error appears in the above-identified patent and that said Letters Patent is hereby corrected as shown below:

On the Title Page

In Column 2 (page 2, item (56)) at Line 38, Under Other Publications, change "legalmatch.com/ ," to --legalmatch.com/),--.

In the Specification

In Column 15 at Line 52, Change "the a" to --the--.

In Column 16 at Line 43, Change "8A-8AC." to --8A-8C.--.

In Column 17 at Line 38, Change "4C" to --FIG. 4C--.

In the Claims

In Column 32 at Line 23, In Claim 11, change "accident" to --accident;--.

In Column 36 at Line 22, In Claim 20, change "comprising;" to --comprising:--.

Signed and Sealed this
Twenty-fourth Day of July, 2018

Andrei Iancu
*Director of the United States Patent and Trademark Office*